United States Patent
Jia et al.

(10) Patent No.: US 11,856,322 B2
(45) Date of Patent: Dec. 26, 2023

(54) DISPLAY APPARATUS FOR IMAGE PROCESSING AND IMAGE PROCESSING METHOD

(71) Applicant: Hisense Visual Technology Co., Ltd., Qingdao (CN)

(72) Inventors: Qiyan Jia, Qingdao (CN); Zhikui Wang, Qingdao (CN); Hongming Zhang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 161 days.

(21) Appl. No.: 17/484,214

(22) Filed: Sep. 24, 2021

(65) Prior Publication Data

US 2022/0014709 A1    Jan. 13, 2022

Related U.S. Application Data

(63) Continuation of application No. PCT/CN2020/083201, filed on Apr. 3, 2020.

(30) Foreign Application Priority Data

Jun. 10, 2019   (CN) .................. 201910498222.3
Oct. 15, 2019   (CN) .................. 201910979876.8

(51) Int. Cl.
*H04N 7/01* (2006.01)
*G06T 7/70* (2017.01)
(Continued)

(52) U.S. Cl.
CPC ............. *H04N 7/0122* (2013.01); *G06T 7/70* (2017.01); *H04N 5/2628* (2013.01);
(Continued)

(58) Field of Classification Search
CPC .... H04N 7/0122; H04N 5/2628; H04N 23/62; H04N 23/632; H04N 23/66; H04N 7/147; H04N 21/4223; H04N 21/4788; H04N 21/4858; H04N 23/63; H04N 23/635; H04N 7/142; H04N 21/2187; H04N 21/4122; H04N 21/4312; H04N 21/440263;
(Continued)

(56) References Cited

U.S. PATENT DOCUMENTS

| | | | |
|---|---|---|---|
| 2005/0100087 A1* | 5/2005 | Hasegawa .............. | H04N 7/181 348/E7.086 |
| 2006/0115185 A1* | 6/2006 | Iida ........................ | H04N 5/2628 |
| 2007/0126868 A1* | 6/2007 | Kiyohara ................ | G06T 7/246 348/143 |
| 2010/0141803 A1* | 6/2010 | Jung ........................ | H04N 5/262 348/E5.051 |

(Continued)

FOREIGN PATENT DOCUMENTS

| CN | 101753817 A | 6/2010 |
|---|---|---|
| CN | 102541494 A | 7/2012 |

(Continued)

*Primary Examiner* — Usman A Khan
(74) *Attorney, Agent, or Firm* — Workman Nydegger

(57) ABSTRACT

Disclosed is a display apparatus. When image data is received, a position of a clipping box is adjusted according to a position of a target object in the image data; and an adjusted image is output to a second chip, the adjusted image is a portion of the image data in the adjusted clipping box, and the second chip is configured to receive the adjusted image output from an image processor and output the adjusted image to a display.

12 Claims, 12 Drawing Sheets

(51) Int. Cl.
*H04N 5/262* (2006.01)
*H04N 23/62* (2023.01)
*H04N 23/66* (2023.01)
*H04N 23/63* (2023.01)

(52) U.S. Cl.
CPC ........... *H04N 23/62* (2023.01); *H04N 23/632* (2023.01); *H04N 23/66* (2023.01)

(58) Field of Classification Search
CPC ......... H04N 21/440272; H04N 21/472; H04N 21/478; G06T 7/70
USPC .................................................. 348/333.12
See application file for complete search history.

(56) References Cited

U.S. PATENT DOCUMENTS

| | | | | |
|---|---|---|---|---|
| 2012/0268641 | A1* | 10/2012 | Kazama | H04N 23/45 348/E5.051 |
| 2014/0211031 | A1* | 7/2014 | Han | H04N 23/00 348/208.99 |

FOREIGN PATENT DOCUMENTS

| | | | |
|---|---|---|---|
| CN | 103220457 | A | 7/2013 |
| CN | 106028117 | A | 10/2016 |
| CN | 107786812 | A | 3/2018 |
| CN | 109089157 | A | 12/2018 |
| CN | 109523503 | A | 3/2019 |
| CN | 110611787 | A | 12/2019 |
| JP | 2016046740 | A | 4/2016 |

* cited by examiner

DISPLAY APPARATUS FOR IMAGE PROCESSING AND IMAGE PROCESSING METHOD

CROSS-REFERENCE TO RELATED APPLICATIONS

This application is a continuation of International Application No. PCT/CN2020/083201 filed Apr. 3, 2020, which claims the benefit and priority of the Chinese Patent Application No. 201910498222.3 filed on Jun. 10, 2019, and Chinese Patent Application No. 201910979876.8 filed on Oct. 15, 2019. The entire disclosures of the above applications are incorporated herein by reference.

FIELD

The present disclosure relates to display technologies, in particular to a display apparatus and an image processing method.

BACKGROUND

This section provides background information related to the present disclosure which is not necessarily prior art.

At present, a display apparatus may provide play images, such as audio, video, pictures, etc. for users, thereby receiving wide attentions from users. However, an existing display apparatus does not have a camera. The users have increasing demands for functions of the display apparatus with development of big data and artificial intelligence. For example, the users would like to have multi-channel video chat images while a display image is played; or a real image of a player may be displayed in real time when the users are in a game scene; or the users may perform long-distance audio-video interaction, etc. in real time with parents/a teacher while studying content in a current image from an educational application.

In order to meet the demands, a camera is generally arranged at the top of a display of the display apparatus, image collection can be realized through the camera, an image is finally sent to the display after being processed through a chip in the display, and thus video chat is realized for the users.

Since the display apparatus is stationary, the camera on the display apparatus may be incapable of adjusting a shooting position flexibly as a mobile phone.

Therefore, there is a need for a display apparatus to adjust a shooting position flexibly to provide better experience for users.

SUMMARY

This section provides a general summary of the disclosure, and is not a comprehensive disclosure of its full scope or all of its features.

In view of the above issues, an objective of the disclosure is to provide a display and an image processing method.

A first aspect of the embodiments of the disclosure provides a display apparatus, including:
 a camera configured to capture image data with a first aspect ratio;
 a controller configured to receive a control signal from a user input interface, the control signal is configured for indicating turning on or turning off the camera;
 a display configured with a second aspect ratio, and configured to present a user interface, the user interface displays content from an application associated with the camera, and the content comprises at least one target object; and
 an image processor configured to:
 receive the image data from the camera in response to an control signal for indicating turning on the camera;
 present an initial image on the display, wherein the initial image is a first portion of the image data in a clipping box in the image data received from the camera, a center point of the clipping box is same as a center of the image data, the clipping box is configured with the second aspect ratio that is different from the first aspect ratio of the image data;
 adjust center position of the clipping box according to a position of the at least one target object in the image data, the at least one target object is in the clipping box after adjustment; and
 output an adjusted image to the display, the adjusted image is a second portion of the image data in the clipping box after adjustment, a distance between a center point of the at least one target object and a center of the clipping box after adjustment is minimized to make the at least target object approximate the center of the clipping box and no black edge exists on the display.

A second aspect of the embodiments of the disclosure provides a display apparatus, including:
 a display configured with a second aspect ratio;
 a camera configured to capture image data with a first aspect ratio;
 a controller configured to receive a control signal input from a user input interface, the control signal is configured for indicating turning on or turning off the camera;
 a first chip comprising an image processor configured to:
 receive the image data from the camera in response to an control signal for indicating turning on the camera;
 adjust a center position of a clipping box according to a position of at least one target object in the image data, an aspect ratio of the clipping box is the second aspect ratio that is different from the first aspect ratio; and
 output an adjusted image to a second chip, the adjusted image is a portion of the image data in the clipping box after adjustment; and
 the second chip configured to receive the adjusted image output from the image processor and output the adjusted image to the display.

A third aspect of the embodiments of the disclosure provide an image processing method for a display apparatus; the display apparatus includes:
 a camera configured to capture image data with a first aspect ratio;
 a display configured with a second aspect ratio;
 a first chip comprising an image processor configured to:
 receive the image data in response to a control signal for indicating turning on the camera;
 adjust a center position of a clipping box according to a position of at least one target object in the image data, the at least one target object is in the clipping box after adjustment, wherein a distance between a center of the at least one target object and a center of the clipping box after adjustment is minimized, and no black edge exists on the display, the clipping box is configured with the second aspect ratio that is different from the first aspect ratio of image data, and output an adjusted image, the adjusted image is a portion of the image data in the clipping box after adjustment; and a second chip configured to receive the adjusted image and output the adjusted image to a display.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
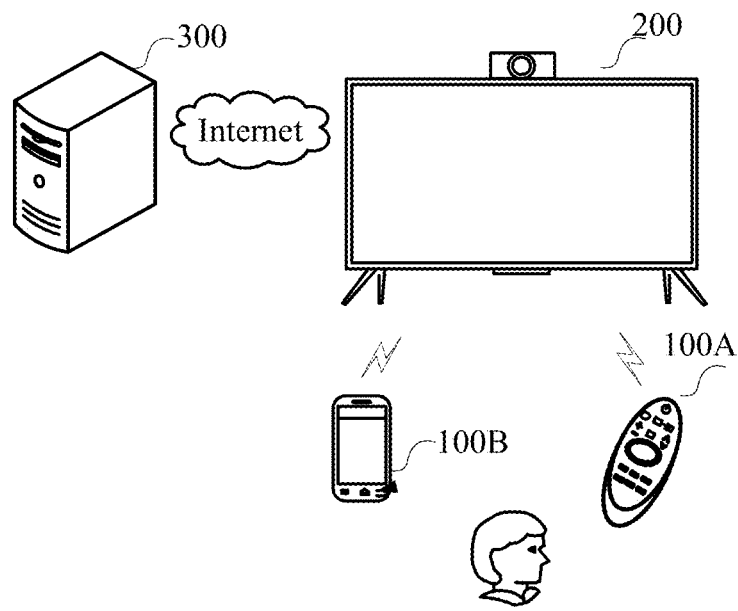
FIG. 1 illustrates a schematic diagram of an operation scenario between a display apparatus and a control device according to an embodiment.

Example embodiments will now be described more fully with reference to the accompanying drawing.

For user's convenience, a display apparatus usually has various external apparatus interfaces to conveniently connect with different external devices or cables so as to realize corresponding functions. When a high-resolution camera is connected to an interface of the display apparatus, if a hardware system of the display apparatus does not have a hardware interface for receiving source codes from the high-pixel camera, data received from the camera may not be presented on a display of the display apparatus.

Besides, due to limitation of a hardware structure, a hardware system of a traditional display apparatus supports only one path of a hard decoding resource and usually supports video decoding with 4K resolution to the maximum degree. Therefore, when a user wants to have a video chat while watching a network TV, without reducing a definition of a network video picture, a network video needs to be decoded by a hard decoding resource (usually a GPU in a hardware system), in this case, a video chat picture is processed only in a mode of soft decoding of the video through a general-purpose processor (e.g., CPU) in the hardware system.

Soft decoding processing of the video chat picture may significantly increase data processing burden for the CPU. When the data processing burden for the CPU is too high, picture lagging or intermittent pictures may occur. Furthermore, due to limitation of data processing capacity of the CPU, when the video chat picture is processed through CPU soft decoding, multi-channel video calls may not be realized usually, and when the user wants to have video chats with other users in the same chat scenario, access blocking may occur.

In view of the above aspects, in order to overcome the defects, the disclosure discloses a double hardware system framework so as to realize multi-channel video chat data (at least one channel of a local video).

The terms mentioned in the disclosure are described below in combination with the drawings. It should be noted that the following description of the terms only intends to make the contents of the disclosure easy to understand and not to limit the protection scope of the disclosure.

A term "remote controller" used in all the embodiments of the disclosure refers to a component of an electronic device (e.g., a display apparatus disclosed in the disclosure), which may generally wirelessly control the electronic device in a short distance range. The component may be connected with the electronic device generally through infrared rays and/or a radio frequency (RF) signal and/or Bluetooth and may include function modules such as WIFI, wireless USB, the Bluetooth, a motion sensor, etc. For example, a hand-held touch remote controller is formed by replacing most of physical built-in hard keys in a common remote controller by a user interface in a touch screen.

A term "gesture" used in all the embodiments of the disclosure refers to a user behavior for expressing an expected idea, an action, a purpose or a result by the user through actions like a change of a hand shape or a hand move, etc.

A term "hardware system" used in all the embodiments of the disclosure may refer to an entity component comprising an integrated circuit (IC), a printer circuit board (PCB) and other mechanical, optical, electric and magnetic devices and having functions of computing, controlling, storing, input and output. In the embodiments of the disclosure, the hardware system is usually called a motherboard or a chip.

FIG. 1 illustrates a schematic diagram of an operation scenario between a display apparatus and a control device according to an embodiment. As shown in FIG. 1, a user may operate the display apparatus 200 through the control device 100.

The control device 100 may be a remote controller 100A and may communicate with the display apparatus 200 according to infrared protocol communication, Bluetooth protocol communication, ZigBee protocol communication or other short-distance communication for controlling the display apparatus 200 in a wireless mode or other wired modes. The user may input a user command through press keys, voice input, control panel input on the remote controller so as to control the display apparatus 200. For example, the user may input a corresponding command through a sound volume up, or volume down key, a channel control key, an up/down/left/right directional key, a voice input press key, a menu key, a start-up and shut down press key, etc. on the remote controller so as to control functions of the display apparatus 200.

The control device 100 may also be an intelligent device, e.g., a mobile terminal 100B, a tablet PC, a computer, a laptop, etc., may communicate with the display apparatus 200 through a Local Area Network (LAN), a Wide Area Network (WAN), a Wireless Local Area Network (WLAN) or other networks, and may control the display apparatus 200 through an application corresponding to the display apparatus 200. For example, the display apparatus 200 is controlled through an application running on the intelligent device. The application may provide various controls for the user on a screen associated with the intelligent device through a visual user interface (UI).

For example, a software application may be installed on both the mobile terminal 100B and the display apparatus 200 so as to realize connection communication between them both though a network communication protocol and then realize purposes of one-to-one control operation and data communication. For example, a control instruction protocol may be established between the mobile terminal 100B and the display apparatus 200, and a remote-control keyboard is synchronized onto the mobile terminal 100B, so that a function of controlling the display apparatus 200 is achieved by controlling the user interface on the mobile terminal 100B; and audio and video contents displayed on the mobile terminal 100B may also be transmitted to the display apparatus 200 to realize a synchronous display function.

As shown in FIG. 1, the display apparatus 200 may also perform data communication with a server 300 in various communication modes. In the embodiments of the disclosure, the display apparatus 200 may be in communication connection with the server 300 through the LAN, the WLAN or other networks. The server 300 may provide various contents and interactions for the display apparatus 200.

For example, the display apparatus 200 receives software updates or access to a remotely stored digital media library by sending and receiving messages and interacting with Electronic Program Guide (EPG). The server 300 may be one group or a plurality of groups or in one type or different types. The server 300 may provide video-on-demand, advertising services and other network service contents.

In one aspect, the display apparatus 200 may be a liquid crystal display, an organic light emitting diode (OLED) display and a projected display apparatus. In another aspect, the display apparatus may be an intelligent TV or a display system comprising a display and a set-top box. A specific type, size, resolution, etc. of the display apparatus are not limited.

The display apparatus 200 may provide a broadcast reception, and additionally provide an intelligent network TV function that a computer supports, including a network TV, an intelligent TV, an internet protocol TV (IPTV), etc. In some embodiments, the display apparatus may not have the broadcast reception function.

As shown in FIG. 1, a camera may be connected to or arranged on the display apparatus and the camera is configured to present a picture captured by the camera onto a display interface of the display apparatus or other display apparatuses so as to realize interaction chat between users. Specifically, the picture captured by the camera may be displayed on a full screen, a half screen or any optional region on the display apparatus.

As an alternative connection mode, the camera is connected with a rear housing of the display apparatus through a connection plate and is fixed in a middle of an upper side of the rear housing of the display apparatus. As a installation manner, the camera may be fixed on any position of the rear housing of the display apparatus as long as it is guaranteed that its image collection region is not blocked by the rear housing, for example, the capture directions of the image is in a same direction as an orientation of the display apparatus.

As another alternative connection, the camera may be connected with rear housing of the display apparatus through the connection plate or other candidates which allow the camera lift up and lift down. A motor is installed on a connector. When the user uses the camera or an application uses the camera, the camera may be lifted above the display. When the camera is not needed, the camera may be embedded into the rear housing, which can prevent it from being damaged.

As an embodiment, the camera used in the disclosure may have 16 million pixels so as to realize a purpose of ultra-high definition. In actual use, a camera with more or less than 16 million pixels may also be adopted.

After the camera is installed on the display apparatus, contents displayed by the display apparatus in different application scenes may be fused in various modes so as to realize a function which is unavailable through a traditional display apparatus.

In some embodiments, a user may have a video chat with at least one of other users while watching a video. The video may be displayed as a background image, and a video chat window may be displayed on the background image. The function may be vividly called "chatting while watching".

Alternatively, in the scenario of "chatting while watching", at least one channel of the video chat is performed across terminals while the user watches a live-stream video or a network video.

In another example, a user may have a video chat with at least one of other uses while studying in an educational application. For example, a student may realize remote interaction with a teacher while studying contents in an educational application. The function is vividly called "chatting while studying".

In another example, a user may have a video chat with a player in a card game while playing the card game. For example, the player may realize remote interaction with other players while entering a game application to participate in the game. The function is vividly called "playing while watching".

Alternatively, a game image is fused with a video image, and a face image in the video picture may be cutout and displayed in a game image so as to improve user experience.

Alternatively, in a motion sensing game (e.g., balls, boxing, running, dancing and the like), the camera obtains postures and motions of a human body, conducts body detection and tracking, conducts human skeleton key point data detection, and makes fusion with animations in the game to realize games scenario and dancing game scenario, etc.

In another example, a user may have video and voice interaction with at least one of other users in a karaoke application. The function is vividly called "singing while watching". Alternatively, when at least one user enters the application in a chatting scene, many users may complete recording of one song together.

In another example, a user may start up a local camera to capture pictures and videos. The function may be vividly called "looking into the mirror".

In other examples, more functions may be added, or the above functions may be reduced. The functions of the display apparatus are not limited specifically in the disclosure.

Figure 2:
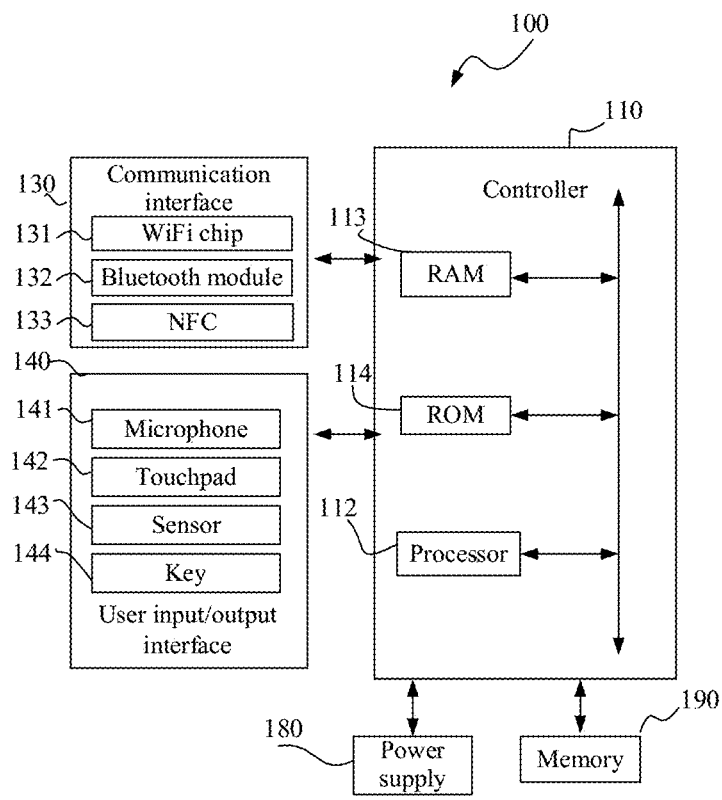
FIG. 2 illustrates a block diagram of hardware configuration of a control device 100 according to an embodiment.

FIG. 2 illustrates a block diagram of configuration of a control device 100 according to an embodiment. As shown in FIG. 2, the control device 100 includes a controller 110, a communicator 130, a user input/output interface 140, a memory 190 and a power supply 180.

The control device 100 is configured to control the display apparatus 200, receive an input operation command from a user and convert the operation command to an instruction which may be recognized and responded by the display apparatus 200, serving to play an interaction intermediary role between the user and the display apparatus 200. For example, the user operates a channel up or channel down key on the control device 100, and then the display apparatus 200 responds to operation of channel up and channel down.

In some embodiments, the control device 100 may be the intelligent device. For example, the control device 100 may have various applications for controlling the display apparatus 200 according to demands of the user.

In some embodiments, as shown in FIG. 1, the mobile terminal 100B or other intelligent electronic devices may have functions similar to those of the control device 100 after installing the applications for controlling the display apparatus 200. For example, the user may install an application to realize functions of physical keys of the control device 100 through various function keys or virtual buttons of the graphical user interface on the mobile terminal 100B or other intelligent electronic devices.

The controller 110 includes a processor 112, a RAM 113 and a ROM 114, a communication interface and a communication bus and is configured to control running and operation of the control device 100, communication coordination between all inner parts and data processing functions of exterior and interior.

Communication of a control signal and a data signal between the communicator 130 and the display apparatus 200 is realized under control of the controller 110. For example, a user input signal is sent to the display apparatus 200. The communicator 130 may include at least one of a WIFI module 131, a Bluetooth module 132, an NFC module 133 or other communication modules.

In the user input/output interface 140, an input interface includes at least one of a microphone 141, a touch panel 142, a sensor 143, a press key 144, etc. For example, a user may realize a user command input function through voice, touch, gestures, pressing and other actions, and the input interface converts an analog signal to a digital signal, converts the digital signal to a corresponding instruction signal and then sends the instruction signal to the display apparatus 200.

An output interface includes interfaces for sending a user command to the display apparatus 200. In some embodiments, the interface may be an infrared interface or a RF interface. For example, if the interface is the infrared signal interface, the user input command needs to be converted to an infrared control signal according to an infrared control protocol and then the signal is sent to the display apparatus 200 through an infrared sending module. For example, if the interface is the RF signal interface, the user input command needs to be converted to a digital signal, and then the digital is modulated according to a RF control signal modulation protocol and sent to the display apparatus 200 through a RF sending module.

In some embodiments, the control device 100 includes the communicator 130 and at least one of the output interfaces. The communicator 130, such as the WIFI module, the Bluetooth module, the NFC module and other modules, is configured in the control device 100, so that the user input command may be coded through a WIFI protocol or a Bluetooth protocol or an NFC protocol to be sent to the display apparatus 200.

The memory 190 is configured to store various running applications, data and applications for driving and controlling the control device 100 under the control of the controller 110 and may store various control signal input from a user.

The power supply 180 is configured to provide power for all elements of the control device 100 under control of the controller 110 and may be a battery and a relevant control circuit.

Figure 3:
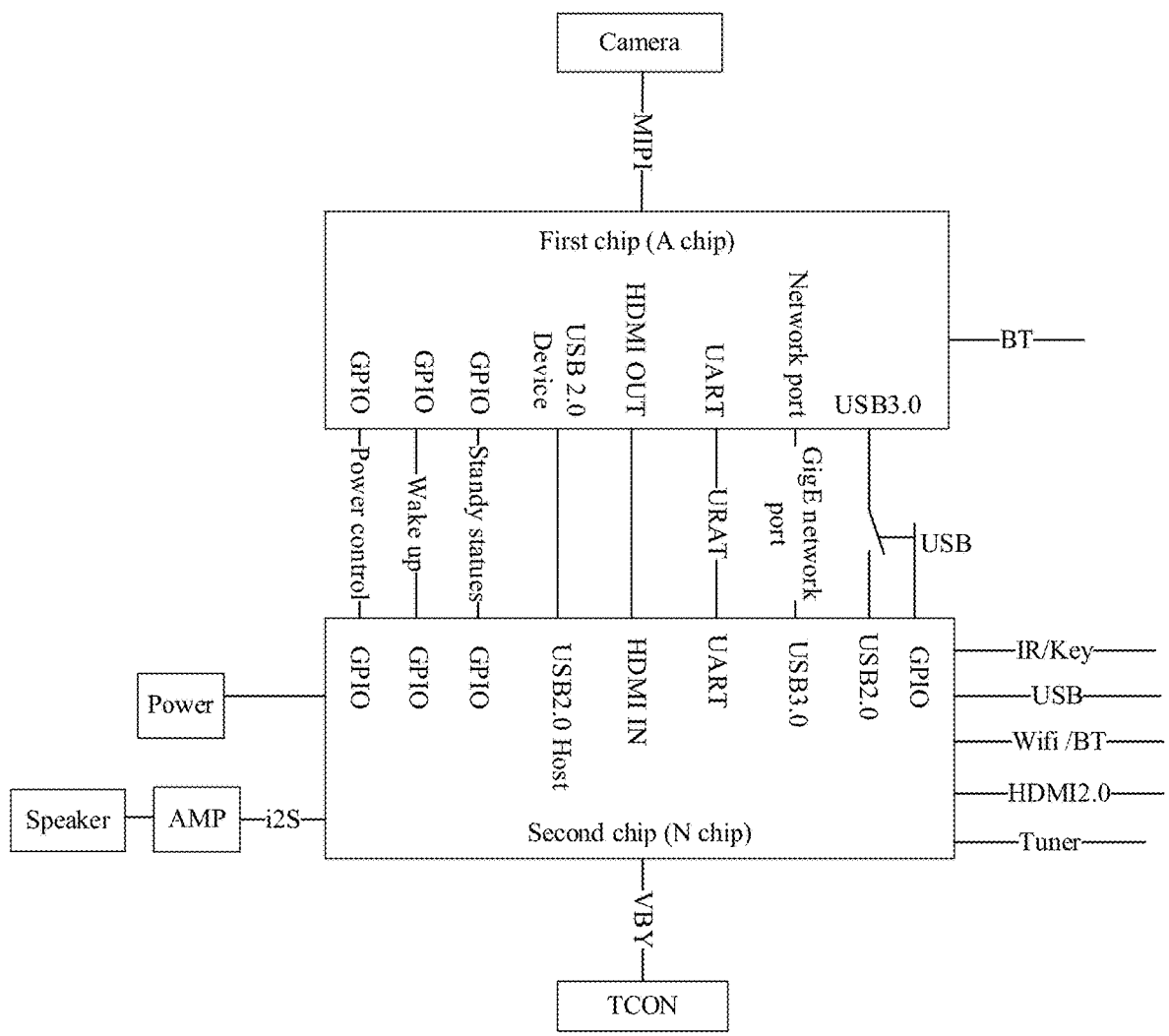
FIG. 3 illustrates a block diagram of hardware configuration of a display apparatus 200 according to an embodiment.

FIG. 3 illustrates a block diagram of hardware configuration of a hardware system in a display apparatus 200 according to an embodiment.

When a double hardware system framework is adopted, a mechanism relation of the hardware system may be shown in FIG. 3. For the sake of convenient description, in the double hardware system framework as follows, one hardware system is called a first hardware system or a system A or a chip A, and the other hardware system is called a second hardware system or a system N or a chip N. The chip A includes a controller of the chip A and various modules connected to the controller of the chip A through various interfaces. The chip N includes a controller of the chip N and various modules connected with the controller of the chip N through various interfaces. The chip A and the chip N may have an relatively independent operation system. The operation system of the chip A and the operation system of the chip N may communicate with each other through a communication protocol. For example a framework layer of the operation system in the chip A and a framework layer of the operation system in the chip N may communicate for command and data transmission so that two subsystems which are independent but mutually associated exist in the display apparatus 200.

As shown in FIG. 3, connection, communication and power supply between the chip A and the chip N may be realized through multiple interfaces with different types. The types of the interfaces between the chip A and the chip N may include a general-purpose input/output (GPIO), a USB interface, a HDMI interface, a UART interface and the like. Communication or power transmission between the chip A and the chip N may be performed through one or more of the interfaces. As shown in FIG. 3, under the double hardware system framework, the chip N may be powered by an external power, and the chip A may be powered by the chip N instead of the external power.

Apart from the interfaces for being connected with the chip N, the chip A may further include interfaces for connecting with other devices or assemblies, e.g., a MIPI interface, a Bluetooth interface and the like in FIG. 3 for connecting with an camera.

Similarly, apart from the interfaces for connecting with the chip N, the chip N may further include a VBY interface for connecting with a display timer control register (TCON), an i2S interface for connecting with an amplifier (AMP) and a speaker, an IR/Key interface, a USB interface, a WIFI interface, a Bluetooth interface, a HDMI interface, a Tuner interface and the like.

Figure 4:
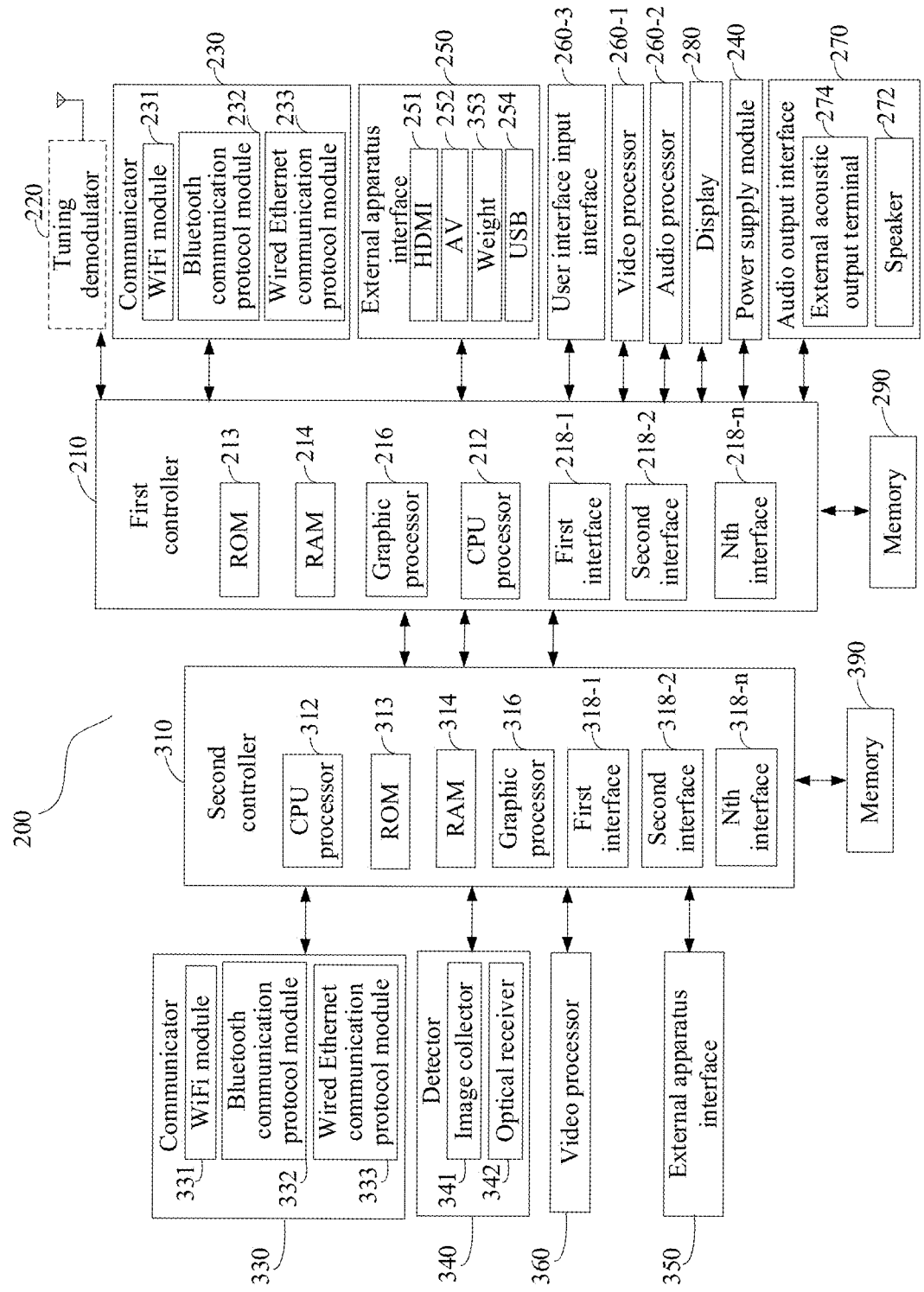
FIG. 4 illustrates a block diagram of a hardware framework of the display apparatus 200 according to FIG. 3.

The double hardware system framework of the disclosure is further discussed in combination with FIG. 4 below. It should be noted that FIG. 4 is only an illustration of the double hardware system framework of the disclosure and is not construed to limit the disclosure. In actual scenarios, the two hardware systems may both include more or less hardware or interfaces if necessary.

FIG. 4 illustrates a block diagram of a hardware framework of a display apparatus 200 according to FIG. 3. As shown in FIG. 4, the hardware system of the display apparatus 200 may include the chip A, the chip N and the modules connected with the chip A or the chip N through the various interfaces.

The chip N may include a tuning demodulator 220, a communicator 230, an external apparatus interface 250, a controller 210, a memory 290, a user input interface, a video processor 260-1, an audio processor 260-2, a display 280, an audio output interface 272 and a power supply. In other embodiments, the chip N may further include more or less modules.

In other embodiments, the tuning demodulator 220 may be in an external device, e.g., an external set-up box, etc. In this case, the set-up box outputs a TV audio/video signal after modulation and demodulation and inputs the signal into the display apparatus 200 through the external apparatus interface 250.

The communicator 230 is a component for communication with an external device or an external server according to various communication protocols. For example, the communicator 230 may include a WIFI module 231, a Bluetooth communication protocol module 232, a wired Ethernet communication protocol module 233, an infrared communication protocol module and other network communication protocol modules or near-field communication protocol modules.

The display apparatus 200 may establish control signal and data signal connection with an external control device or a content providing device through the communicator 230. For example, the communicator may receive a control signal from the remote controller 100A according to control of the controller.

The external apparatus interface 250 is a component for providing data transmission among the chip N, the controller 210, the chip A and other external devices. The external apparatus interface may be connected with external devices like the set-up box, a game apparatus, a laptop, etc. in a wired/wireless mode and may receive data such as a video signal (e.g., a motion image), an audio signal (e.g., music), additional information (e.g., EPG), etc. from the external devices.

The external apparatus interface 250 may include: any one or more of a high-definition multi-media interface (HDMI) 251, a composite video blanking synchronization (CVBS) 252, an analog or digital component 253, a universal serial bus (USB) 254, a red/green/blue (RGB)(not shown in figures), etc. The number and type of the external apparatus interfaces are not limited in the disclosure.

The controller 210 is configured to control work of the display apparatus 200 and respond to operation from a user by operating various software applications (e.g., an operation system and/or various applications) stored on the memory 290.

As shown in FIG. 4, the controller 210 includes a read-only memory (ROM) 213, a random access memory (RAM) 214, a graphics processor 216, a CPU 212, a communication interface 218 and a communication bus. The ROM 213, the RAM 214, the graphics processor 216, the CPU 212 and the communication interface 218 are connected through the bus.

In some embodiments, the CPU 212 may include multiple processors. The multiple processors may include a main processor and one or more sub-processor. The main processor is configured to perform some operations of the display apparatus 200 in a pre-power on mode, and/or operations of a displayed image in a normal mode. The one or more sub-processor is configured to perform operations in standby mode, etc.

The communication interface may include a first interface 218-1 to an $n^{th}$ interface 218-n. These interfaces may be network interfaces connected to the external device through networks.

The controller 210 may control overall operation of the display apparatus 200. For example, in response to receiving a user command for selecting a UI object displayed on the display 280, the controller 210 may perform operations relevant to the object selected by the user command.

The memory 290 includes various stored software modules for driving and controlling the display apparatus 200. For example, the various software modules stored in the memory 290 include: a basic module, a detection module, a communication module, a display control module, a browser module, various service modules, etc.

For example, a voice recognition module includes a voice parsing module and a voice instruction database module. The display control module is a module configured to control the display 280 to display image contents and may be configured to play information like multi-media image contents, an UI interface, etc. The communication module is a module configured to control and conduct data communication between the module and the external device. The browser module is a module configured to perform data communication between browsing servers. The service modules are modules configured to provide various services and various applications.

Meanwhile, the memory 290 may be further configured to store and receive external data and user data, images of various objects in the user interface, a visual effect image of a focus object, etc.

The user input interface is configured to send an input signal from a user to the controller 210.

In some embodiments, a user may input a user command on the graphics user interface (GUI) displayed on the display 280, and the user input interface receives the user input command through the GUI. Alternatively, the user may input the user command by inputting a specific sound or gesture, and the user input interface recognizes the sound or the gesture through the sensors to receive the user input command.

The video processor 260-1 is configured to receive a video signal and perform video data processing to obtain a video signal which may be displayed or played directly on the display 280.

For example, the video processor 260-1 includes a de-multiplexing module, a video decoding module, an image synthesis module, a frame rate conversion module, a display formatting module, etc.

The display 280 is configured to receive an image signal input from the video processor 260-1 to display video contents, images and a menu control interface. The display 280 includes a display component for displaying images and a driving component for driving image displaying. The displayed video contents may be videos in a broadcast signal received by the tuning demodulator 220, or video contents input from the communicator or the external device interface. The display 220 simultaneously displays the user interface (UI) generated in the display apparatus 200 and configured to control the display apparatus 200.

The display 280 may further include a driving component for driving displaying according to different types of displays 280. Alternatively, if the display 280 is a projection display, the display 280 may further include a projection apparatus and a projection screen.

The audio processor 260-2 is configured to receive an audio signal and perform audio data processing like de-compression, decoding, de-noising, digital/analog conversion, amplification processing, etc. according to the standard coding-decoding protocol of the input signals so as to obtain an audio signal which may be played in the speaker 272.

The audio output interface 270 is configured to receive an audio signal output from the audio processor 260-2 under the control of the controller 210 and may include the speaker 272 or an external sound output terminal 274.

In other embodiments, the video processor 260-1 may include one or more chips. The audio processor 260-2 may also include one or more chips.

In other embodiments, the video processor 260-1 and the audio processor 260-2 may be a single chip, or be integrated into one or more chips together with the controller 210.

The power supply is configured to provide power input from the external power for the display apparatus 200 under the control of the controller 210. The power supply may include a built-in power circuit installed in the display apparatus 200, or a power supply installed outside the display apparatus 200, e.g., a power interface in the display apparatus 200 for providing external power.

Similar to the chip N, as shown in FIG. 4, the chip A may include a controller 310, a communicator 330, a detector 340 and a memory 390. In some embodiments, the chip A may further include a user input interface, a video processor, an audio processor, a display and an audio output interface. In some embodiments, a power supply for independently powering the chip A may exist.

The communicator 330 is a component configured to communicate with the external device or the external server according to various communication protocols. For example, the communicator 330 may include a WIFI module 331, a Bluetooth communication protocol module 332, a wired Ethernet communication protocol module 333, an infrared communication protocol module and other network communication protocol modules or near-field communication protocol modules.

The communicator 330 of the chip A interacts with the communicator 230 of the chip N. For example, the WIFI module 231 in the hardware system of the chip N is configured to connect with an external network for network communication with the external server, etc. The WIFI module 331 in the hardware system of the chip A is configured to connect to the WIFI module 331 of the chip N and does not have direct connection with the external network, etc. The chip A is connected with the external network through the chip N. Thus, as for a user, a display apparatus as mentioned in the above embodiments displays a WIFI account to the outside.

The detector 340 is a component of the chip A of the display apparatus to collect external environment or signals interacting with the outside. The detector 340 may include an optical receiver 342 and a sensor configured to collect intensity of ambient light and may self-adapt to change of display parameters by collecting the ambient light. The detector 340 may further include an image collector 341, e.g., a photographing device, a camera, a webcam etc. for collecting an external environment scene and attributes of the user or gestures interacting with the user and may self-adapt to change display parameters and recognize the gestures of the user so as to realize a function of interaction with the user.

The external apparatus interface 350 is a component for providing data transmission between the controller 310 and the chip N or the other external devices. The external apparatus interface may be connected with the external devices like the set-up box, the game apparatus, the laptop, etc. in a wired/wireless manner.

The controller 310 is configured to control work of the display apparatus 200 and respond to operations from a user by operating various software applications (e.g., a third-party application, etc.) stored on the memory 390 and interacting with the chip N.

As shown in FIG. 4, the controller 310 includes a read-only memory (ROM) 313, a random access memory (RAM) 314, a graphics processor 316, a CPU 312, a communication interface 318 and a communication bus. The ROM 313, the RAM 314, the graphics processor 316, the CPU 312 and the communication interface 318 are connected through the bus.

The communication interface may include a first interface 318-1 to an $n^{th}$ interface 318-n. These interfaces may be network interfaces connected to the external devices through the networks, or network interfaces connected to the chip N through the networks.

The controller 310 may control overall operation of the display apparatus 200. For example, in response to receiving a user command for selecting a UI object displayed on the display 280, the controller 210 may perform operations relevant to the object selected by the user command.

The graphics processor 316 of the chip A and the graphics processor 216 of the chip N may both generate various graphics objects. Their difference lies in that, if an application 1 is installed on the chip A, and an application 2 is installed on the chip N, when a user is in an interface of the application 1 and a command input by the user are performed in the application 1, the graphics processor 316 of the chip A generates the graphics objects. When the user is in an interface of the application 2 and the command input by the user are performed in the application 2, the graphics processor 216 of the chip N generates graphics objects.

Figure 5:
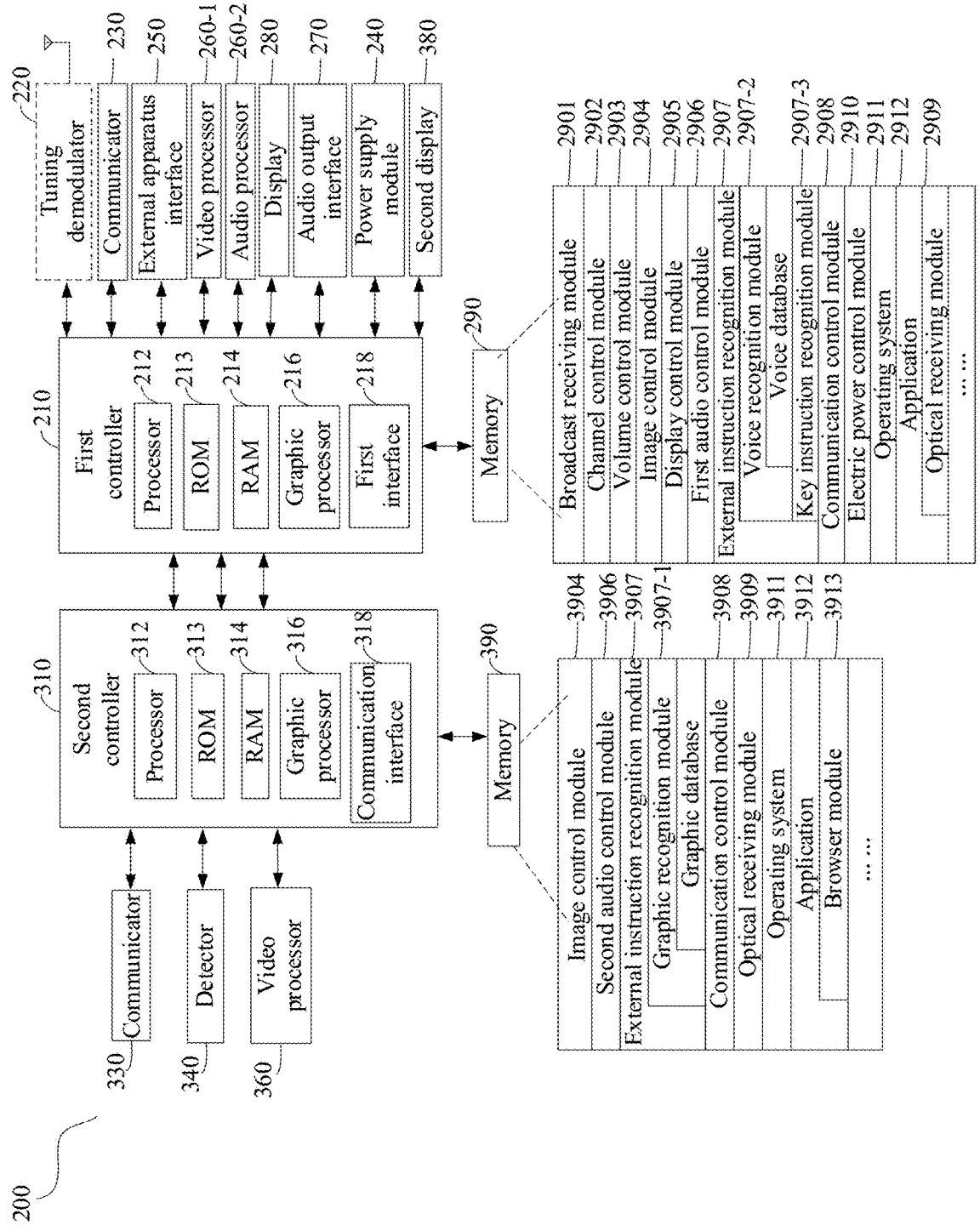
FIG. 5 illustrates a schematic diagram of function configuration of a display apparatus 200 according to an embodiment.

FIG. 5 illustrates a schematic diagram of function configuration of a display apparatus according to an embodiment.

As shown in FIG. 5, the memory 390 of the chip A and the memory 290 of the chip N are configured to store the operating systems, applications, contents, user data, etc. respectively and driving system running of the display apparatus and responding to various operations from a user under control of the controller 310 of the chip A and the controller 210 of the chip N. The memory 390 of the chip A and the memory 290 of the chip N may include volatile and/or non-volatile memories.

As for the chip N, the memory 290 is further configured to store operating programs for driving the controller 210 in the display apparatus 200, the various applications in the display apparatus 200, the various applications downloaded by the user from the external devices, various graphics user interfaces associated with the applications, various objects associated with the graphics user interfaces, user data information and various inner data supporting the applications. The memory 290 is configured to store system software like an OS (operating system) kernel, a middleware, applications, etc. of an operation system (OS), and store input video data and audio data, and other user data.

The memory 290 is further configured to store driving programs and relevant data of the video processor 260-1, the audio processor 260-2, the display 280, the communication interface 230, the tuning demodulator 220, the input/output interface, etc.

For example, the memory 290 includes a broadcast receiving module 2901, a channel control module 2902, a sound volume control module 2903, an image control module 2904, a display control module 2905, an audio control channel 2906, an external instruction recognition module 2907, a communication control module 2908, a light receiving module 2909, a power control module 2910, an operation system 2911, other applications 2912, a browser module, etc. The controller 210 performs various functions such as: a broadcast TV signal receiving demodulation function, a TV channel selection control function, a sound volume selection control function, an image control function, a display control function, an audio control function, an external instruction recognition function, a communication control function, a light signal receiving function, a power control function, a software operation platform supporting various functions, a browser function, etc. by operating the various software programs in the memory 290.

The memory 390 includes various software modules configured to drive and control the display apparatus 200. For example, the various software modules stored in the memory 390 include: a basic module, a detection module, a communication module, a display control module, a browser module, various service modules, etc. The functions of the memory 390 are similar to those of the memory 290, so that the similar functions are referred to the memory 290 and will omit herein.

For example, the memory 390 includes an image control module 3904, an audio control module 3906, an external instruction recognition module 3907, a communication control module 3908, a light receiving module 3909, an operation system 3911, other applications 3912, a browser module, etc. The controller 210 performs various functions such as: image control function, display control function, audio control function, external instruction recognition function, communication control function, light signal receiving function, power control function, software operation platform supporting various functions, browser function, etc. by operating the various software programs in the memory 290. Their difference lies in that, the external instruction recognition module 2907 of the chip N and the external instruction recognition module 3907 of the chip A may recognize different instructions.

For example, an image receiving device, e.g., the camera, is connected with the chip A, thus the external instruction recognition module 3907 of the chip A may include a graphics recognition module 3907-1, a graphics database is stored in the graphics recognition module 3907-1, when the camera receives an external graphics command, a corresponding relation with instructions in the graphics database is established, and an instruction control over the display apparatus is made. A voice receiving device and the remote controller are connected with the chip N, thus the external instruction recognition module 2907 of the chip may include a voice recognition module 2907-2, a voice database is stored in the graphics recognition module 2907-2, when the voice receiving device, etc. receives an external voice command, a corresponding relation with instructions in the voice database is established, and instruction control over the display apparatus is made. Likewise, the control device 100 like the remote controller, etc. is connected with the chip N, and instruction interaction with the control device 100 is performed through a key instruction recognition module.

Figure 6A:
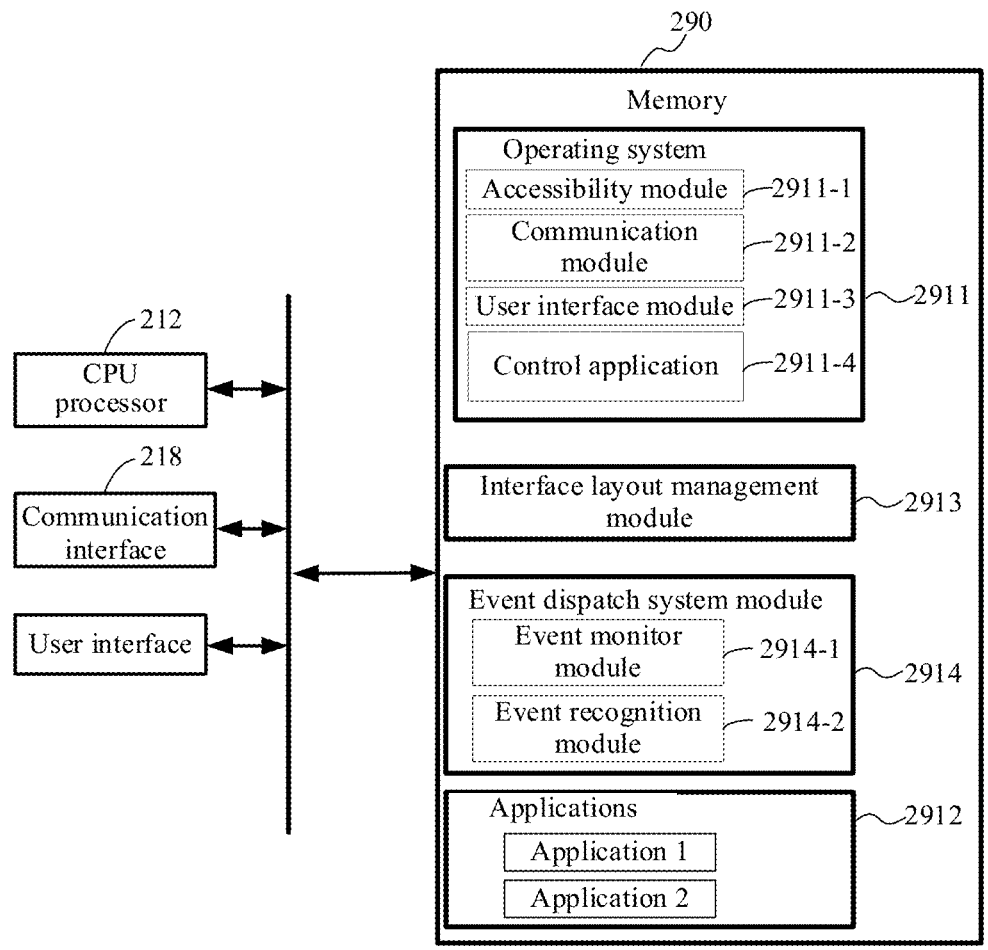
FIG. 6A illustrates a schematic diagram of software configuration of a display apparatus 200 according to an embodiment.

FIG. 6A illustrates a block diagram of configuration of a software system of a display apparatus 200 according to an illustrative embodiment.

As for the chip N, as shown in FIG. 6A, the operation system 2911 includes an operation-performing software configured to process various basic system services and implement relevant tasks of hardware, serving as a media for completing data processing between the application and a hardware component.

In some embodiments, part of the operation kernel system may include a series of software for managing hardware resources of the display apparatus and proving services for the other applications or software codes.

In other embodiments, part of the operation kernel system may include one or more device drivers. The device drivers may be a group of software codes in the operation systems to help to operate or control devices or hardware associated with the display apparatus. The drivers may include codes for operating the video, audio and/or other multi-media components, and includes a display, a camera, a Flash, a WIFI and an audio driver.

An accessibility module 2911-1 is configured to modify or access applications to realize accessibility of the applications and operations of their display contents.

The communication module 2911-2 is configured to connect with other external devices through associated communication interfaces and the communication network.

The user interface module 2911-3 is configured to provide an object for displaying a user interface to access the applications, so that user's operations may be realized.

The control application 2911-4 is configured to control progress management, including a running time application, etc.

An event dispatch system 2914 may be realized in the operation system 2911 or the applications 2912. In some embodiments, the event dispatch system is realized in the operation system 2911 and the application 2912 at the same time, and is configured to monitor various user input events, responding to a recognition result of various events or sub-events according to various event references, and then implementing one or more groups of pre-defined processing.

An event monitor module 2914-1 is configured to monitor events or sub-events input via the user input interface.

An event recognition module 2914-2 is configured to recognize various events or sub-events according to definitions of the various events input from the user input interface, and transmit the events to perform corresponding one or more groups of processing.

The events or sub-events refer to inputs of detection of one or more sensors in the display apparatus 200 and inputs from an external control device, such as the control device 100.

A page layout management module 2913 directly or indirectly receives various user input events or sub-events monitored from the event dispatch system 2914, and is configured to update layout of the user interface. Updating the layout includes but is not limited to performing operations on positions of various controls or sub-controls in the interface, and sizes or positions of containers, hierarchies, etc. associated with layout of the interface.

Functions of the operation system 3911 of the chip A are similar to those of the operation system 2911 of the chip N, and thus the similar functions may refer to the operation system 2911 and will omit herein.

Figure 6B:
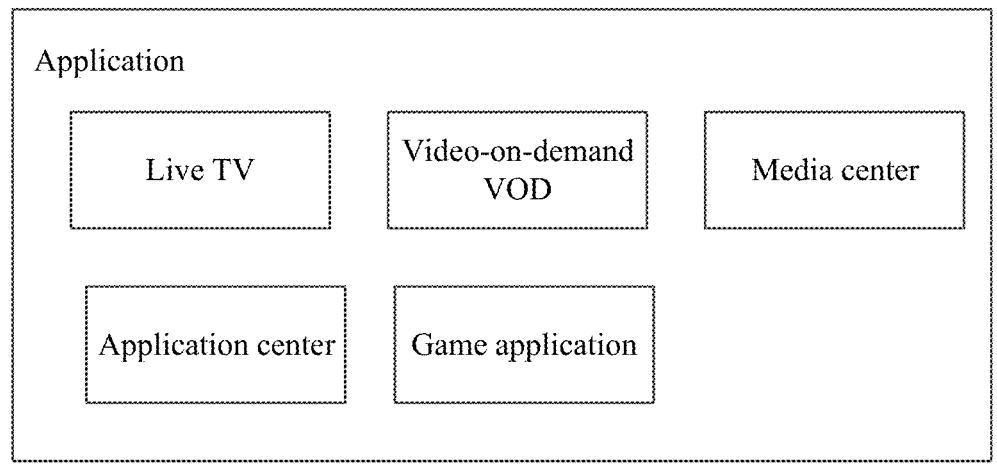
FIG. 6B illustrates a schematic diagram of configuration of an application of a display apparatus 200 according to an embodiment.

As shown in FIG. 6B, an application layer of the display apparatus includes various applications which may be performed in the display apparatus 200.

The application layer 2912 of the chip N may include but not limited to one or more applications, e.g., a video-on-demand application, an application center, a game application, etc. An application layer 3912 of the chip A may include but not limited to one or more applications, e.g., a live-stream TV application, a media center application, etc. It should be noted that what applications are included on the chip A and the chip N is determined by the operation system and other designs. The disclosure does not intend to limit and divide the applications included on the chip A and the chip N.

The application center may provide various stored applications. The applications may be a game application, or some other applications which may be relevant to a computer system or other devices but may run on the display apparatus. The application center may obtain these applications from different sources and store the applications in a local memory, and the applications may run on the display apparatus 200.

Figure 7:
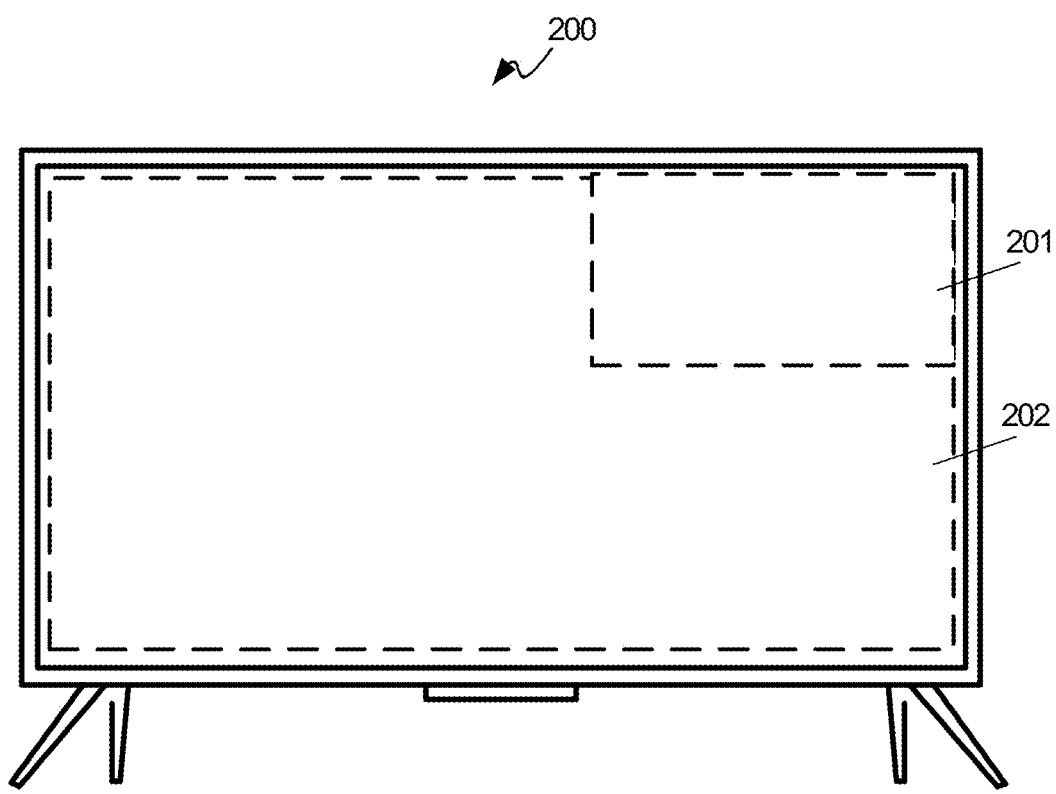
FIG. 7 illustrates a schematic diagram of a user interface of a display apparatus 200 according to an embodiment.

FIG. 7 illustrates a schematic diagram of a user interface of a display apparatus 200 according to an embodiment. As shown in FIG. 7, the user interface includes a plurality of view display regions, For example a first view display region 201 and a playing image 202. The playing image includes arranging one or multiple different projects. The user interface further includes a selector for indicating that the projects are selected, a position of the selector may be changed through user input, and thus selection of different projects is changed.

It should be noted that the multiple view display regions may display images with different priority hierarchies. For example, the first view display region may display video chat item contents, and a second view display region may display application layer item content (e.g., webpage video, VOD display, application images, etc.).

Alternatively, there are priority hierarchies for the displaying of the different view display regions. The view display regions with different priorities are different in presenting. For example, the priority of a system layer is higher than the priority of an application layer. When a user uses a selector and switches an image on the application layer, image displaying of the system layer on the view display region is not blocked. When a size and position of the application layer on the view display region change according to a user selection, a size and position of the system layer on the view display region are not affected.

Image with same priorities may be displayed. In this case, a selector may be switched between the first view display region and the second view display region, and when a size and position of the first view display region change, the size and the position of the second view display region may change.

The chip A and the chip N may both have independent operation systems, so that two sub-systems which are independent but associated with each other may exist in the display apparatus 200. For example, the chip A and the chip N may both have an Android and various APP, so that each chip may realize certain functions, and the chip A and the chip N cooperate to realize one function.

The display apparatus is fixed in position and is not easy to move, so the camera on the display apparatus may be not able to adjust a shooting position flexibly as a mobile phone.

Figure 8A:
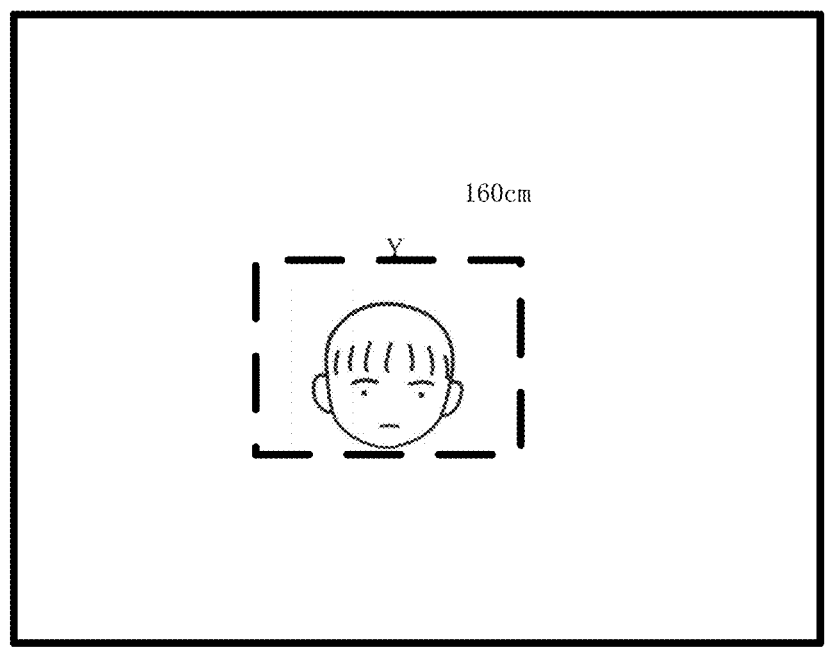
FIG. 8A illustrates an example clipping picture.
Figure 8B:
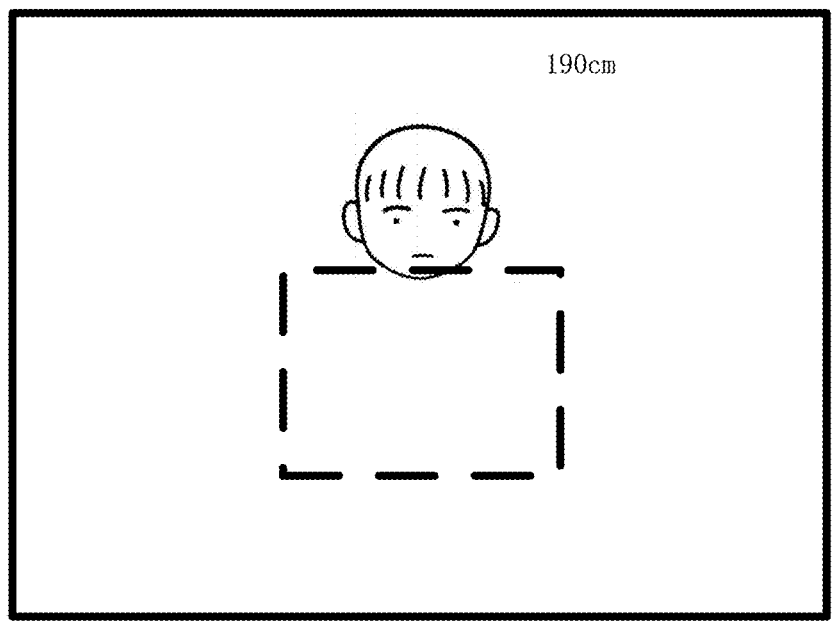
FIG. 8B illustrates an example clipping picture.

If a set height of an existing device is suitable for a user with a height of 160 cm, a image displayed on the display from the image collected by the camera is shown in FIG. 8A. If a user with a height of 190 cm uses the same display apparatus to collect an image, an image on the display is shown in FIG. 8B, in this case, the user needs to adjust the position to make sure that a whole face of the user may be in the display.

Figure 9:
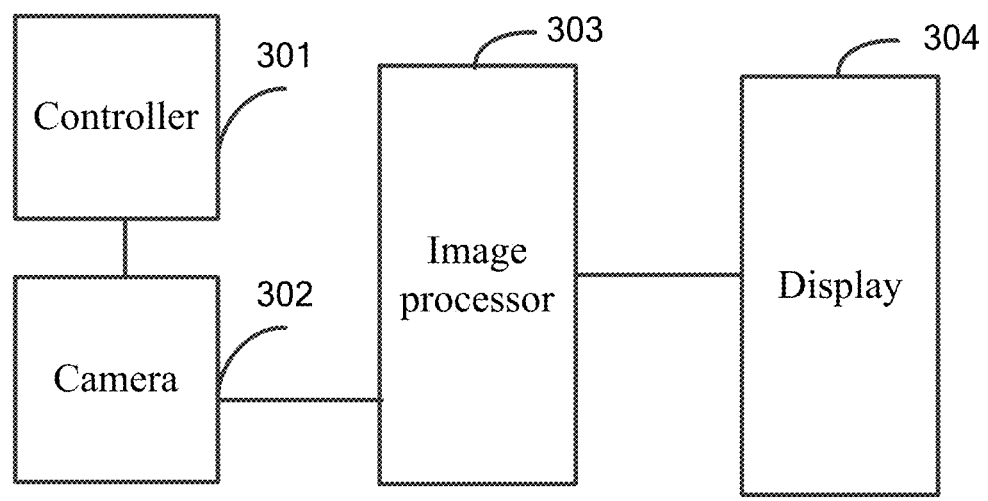
FIG. 9 illustrates a structural block diagram of a display apparatus.

In view of the above issues, the embodiments of the disclosure provide a display apparatus. See FIG. 9, the display apparatus includes:
  a controller 301, configured to receive a control signal from a user input interface, the control signal is configured for indicating turning on or turning off the camera;
  a camera 302, configured to capture image data with a first aspect ratio; and
  an image processor 303, configured to receive the image data from the camera 302 in response to a control signal for indicating turning on the camera.

In the embodiments of the disclosure, the shooting angle of the camera 302 is 4:3 aspect ratio, and thus the first aspect ratio is 4:3. In the embodiments of the disclosure, a resolution of the image data may be any one of 640*480, 800*600, 960*720, 1024*768, 1152*864, 1280*960, 1400*1050, 1440*1080, 1600*1200, 1856*1392, 1920*1440 and 2048*1536.

In the embodiments of the disclosure, the first aspect ratio of the shooting angle of the camera 302 is 4:3. With the same size, a practical area in the ratio format of 4:3 is larger than that of other ratio formats. Thus it is guaranteed that the image data collected by the camera 302 shown in the embodiment of the disclosure include more information.

In the embodiments of the disclosure, an aspect ratio of a display is the same as that of a clipping box and is also called a second aspect ratio, and the second aspect ratio is 16:9. The display with the second aspect ratio 16:9 is more suitable for watching DVD and a high-definition TV program. A current video ratio is usually 16:9, and the display with the second aspect ratio 16:9 may minimize a black edge thereby increasing a display area.

In the embodiments of the disclosure, a resolution of the display may be: any one of 3840*2160 (super-high definition 4K), 2560*1440 (2K), 1920*1080 (1080p full high definition), 1600*900, 1366*768, 1280*720 (720p high definition) and 1024*576. It should be noted that in the embodiments of the disclosure, the resolution of the display is smaller than that of the image data.

The image processor 303 is further configured to adjust a center position of the clipping box according to a position of at least one target object in the image data and output an adjusted image to the display 304, the adjusted image is a portion of image data corresponding the area of the clipping box after adjustment, meaning that the adjusted image is a portion of the image data clipped from the original image data captured from the camera by the clipping box, the clipping box is configured with the second aspect ratio same with that of the display, and the second aspect ratio is different from the first aspect ratio.

The position of the target object position may be obtained automatically by the image processor 303 or obtained according to a user selection.

In some embodiments, the position of the at least one target object is obtained according to a user selection. The display 304 is configured to display an initial image and the clipping box, and a position of the clipping box is in a center of the display in an initial state. The display 304 is configured to display an image interface, a user interface and a selector configured for indicating an item being selected in the user interface. The image interface is configured to display an image output from the image processor 303. In response to a selection via the selector from a user, the image processor 303 is further configured to obtain the position of the target object selected by the user.

The image processor 303 can automatically obtain the position of the at least one target object. In some embodiments of the disclosure, the image processor 303 may obtain the position of a target object through a face recognition technology. Specifically, position information of face feature points may position a face, verify a face detection result and accurately indicate a position of the face in face detection.

In a face feature positioning method based on ASM, in the embodiments of the disclosure, Active Shape Model (ASM) positioning may be adopted, or Active Appearance Model (AAM) positioning may be adopted. A center point of the face is the position of the target object.

In some embodiments, a process for adjusting the clipping box is: firstly, whether a center of the clipping box is consistent with the center of the at least one target object or not is determined in the initial state; if so, the position of the clipping box does not need to be adjusted, or otherwise, the position of the clipping box is adjusted according to the position of a target object or target objects.

Figure 10:
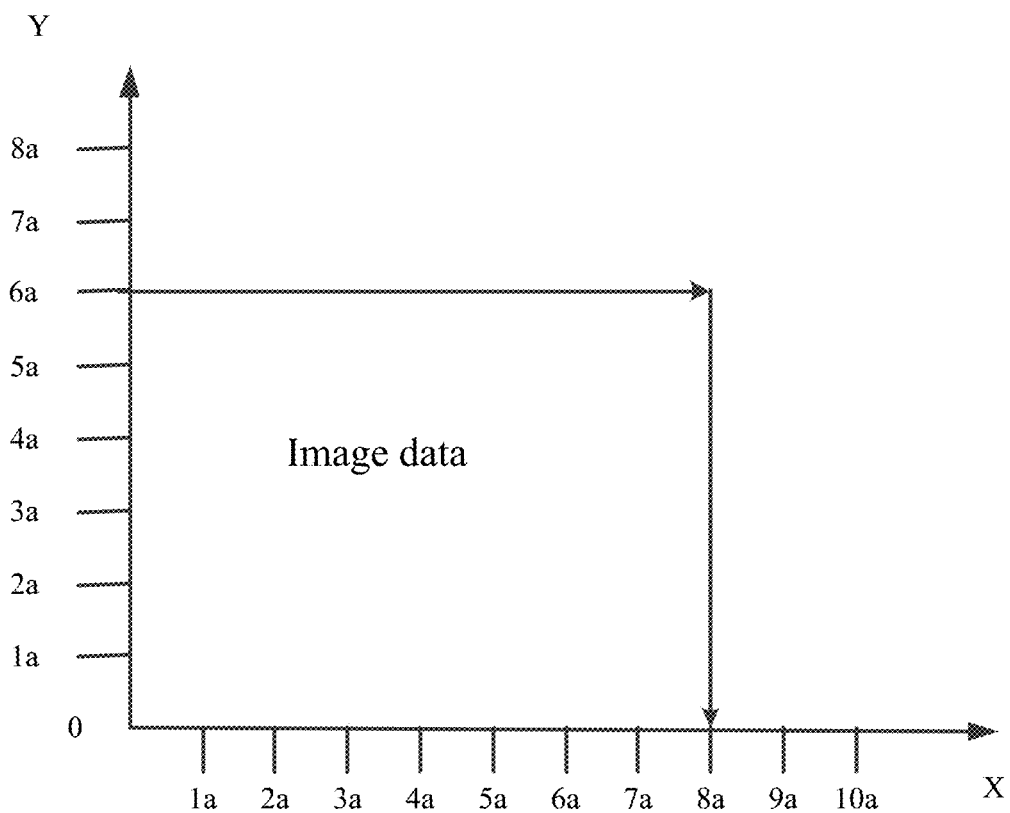
FIG. 10 illustrates coordinate axes in the embodiments of the disclosure.

In the embodiments of the disclosure, coordinate axes are created first and use a lower left corner point of the image data as an original point, an extended line in a height direction of the image data is a Y axis, and an extended line in a width direction of the image data is an X axis, as shown in FIG. 10. It may be seen that the Y axis of the coordinate axes is the extended line in the height direction of the image data, and the X axis of the coordinate axes is the extended line in the width direction of the image data.

For the convenience of computation, in the embodiments of the disclosure, an original point (0,0) of the coordinate axes may be used, that is a coordinate of the lower left corner point of the clipping box in the initial state.

Alternatively, when a user uses the camera 302 of the display apparatus for image capture, the user is more likely to face a center of the camera 302. In this case, a display image suitable for the display is clipped in the center of the image data. It may be guaranteed that the face occupies a large ratio in the whole displayed image.

In order to meet the above demands, in the embodiments of the disclosure, in the initial state, a coordinate of the lower left corner of the clipping box is (X, Y) and is also called a starting coordinate in the disclosure;

$X=(Wc-Wt)/2$; and $Y=(Hc-Ht)/2$,

Wc is a width of the image data, and Hc is a height of the image data; and

Wt is a width of the clipping box, the width of the clipping box is consistent with that of the resolution of the display, Ht is a height of the clipping box, and the height of the clipping box is consistent with that of the resolution of the display.

Figure 11:
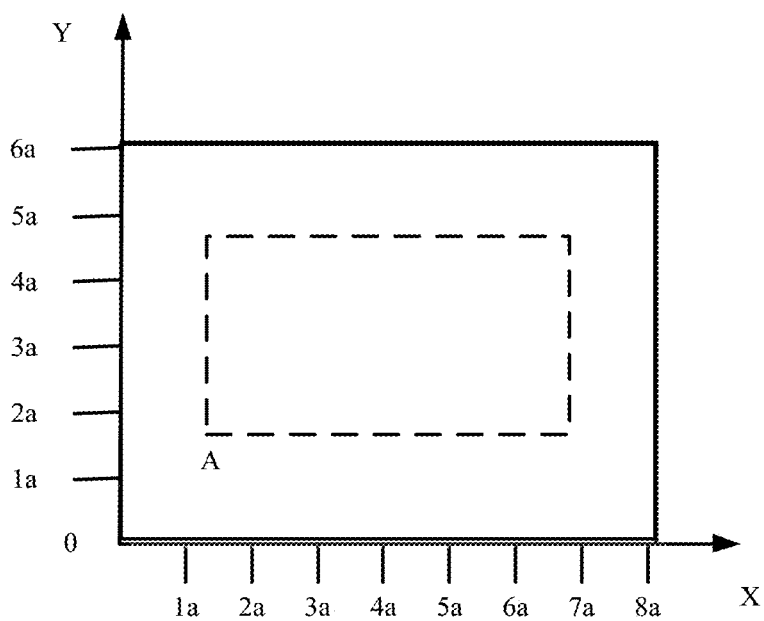
FIG. 11 illustrates a schematic diagram of a relative position of image data and a clipping box.

Accordingly, in FIG. 11, the outer rectangle is an image whose size corresponding to image data collected from the camera, the width of the image data is Wc, and the height of the image data is Hc. The broken line rectangle inside the outer rectangle in the FIG. 11 is the clipping box whose width is Wt and height is Ht.

In the initial state, the coordinate of the lower left corner point of the clipping box is (X, Y), wherein $X=(Wc-Wt)/2$ and $Y=(Hc-Ht)/2$. It may make sure that the face of a target object occupies a large ratio in the whole displayed image.

In the embodiments of the disclosure, whether a coordinate (a second center point coordinate) of the target object's position is consistent with a center coordinate (a first center coordinate) of the clipping box or not is determined, and thus whether the position of the clipping box needs to be adjusted or not can be determined.

Figure 12:
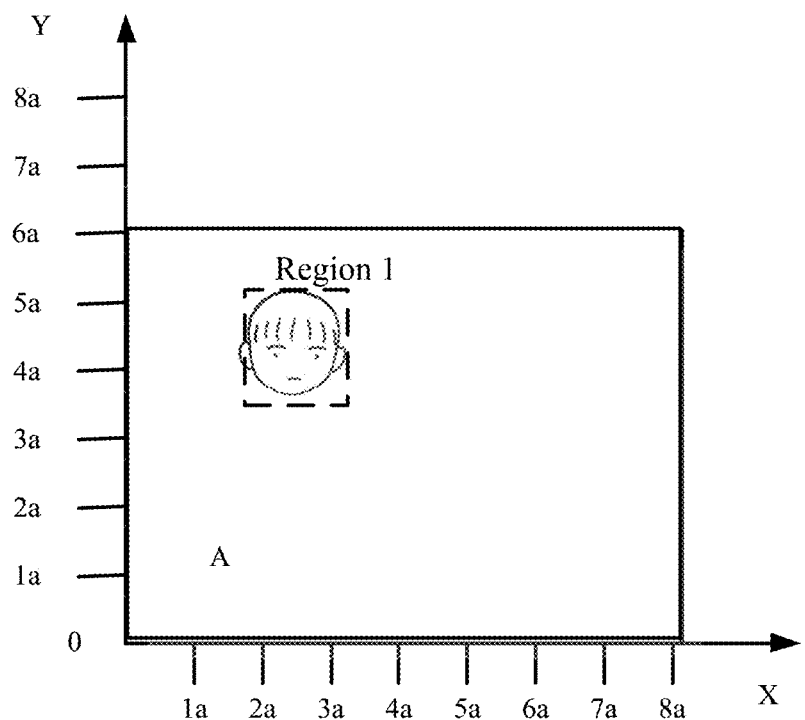
FIG. 12 illustrates a schematic diagram of face positioning.

Accordingly, firstly, the image processor 303 obtains the second center point coordinate, wherein the second center point coordinate may be obtained according to a user selection or automatically obtained by the image processor 303. If it is automatically obtained by the image processor 303, as shown in FIG. 12, the face falls in a region 1, and a center point of the region 1 is a second center point.

Then the image processor 303 determines whether the second center point coordinate is same with the first center coordinate. If yes, the image shown on the display is the image needed for the user. In this case, a portion of the image in the region of the clipping box may be output to the display 304.

(5) If not, the position of the clipping box is adjusted according to the second center point coordinate, an adjusted image is output to the display 304 and the adjusted image is a portion of the image data in a region of the clipping box after adjustment. In other words, the adjusted image is an image corresponding to a portion of the image data in a region of the adjusted clipping box.

A first method for adjusting the position of the clipping box includes:
  the second center point coordinate is (Xo, Yo), and a coordinate of the lower left corner of the clipping box after adjusting is (X1, Y1);
  if Xo<=Wt/2, X1=0; and
  if Yo<=Ht/2, Y1=0.

For example, the resolution of the display is set to be 1600*900, the resolution of the image data is set to be 1856*1392, correspondingly, Wt=900, Ht=1600, Wc=1392, and Hc=1856.

Figure 13A:
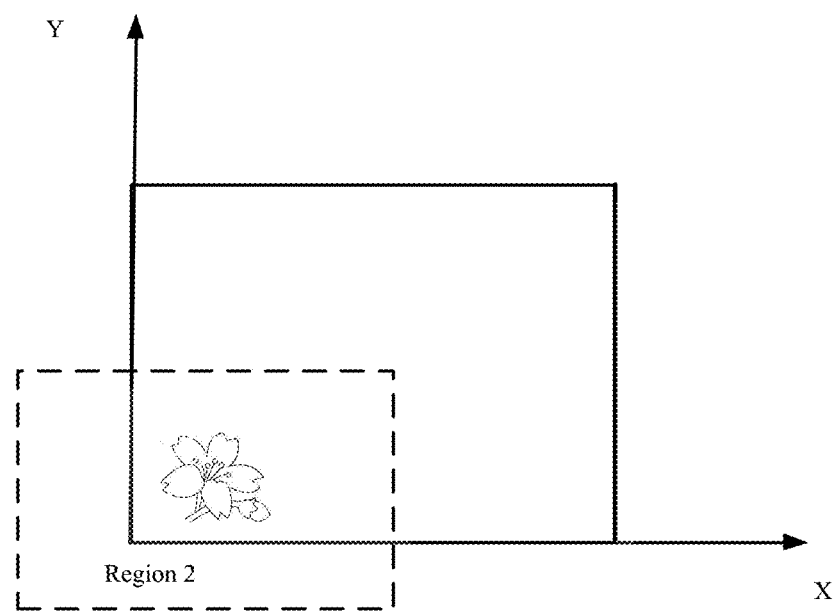
FIG. 13A illustrates a clipping picture under a condition that Xo<=Wt/2 and Yo<=Ht/2.

In the embodiments of the disclosure, if the user wants to display a flower pattern in the display, the second center point coordinate input from the user is (57, 60), Xo<=Wt/2, and Yo<=Ht/2. In this case, if a position of the first center point is directly adjusted to a position of the second center point, a situation in FIG. 13A will occur. An effect displayed on the display is that a corresponding image may not be displayed in a position of a region 2. In order to avoid this issue, the embodiments of the disclosure provide a solution.
  If Xo<=Wt/2, X1=0; and
  if Yo<=Ht/2, Y1=0.

Figure 13B:
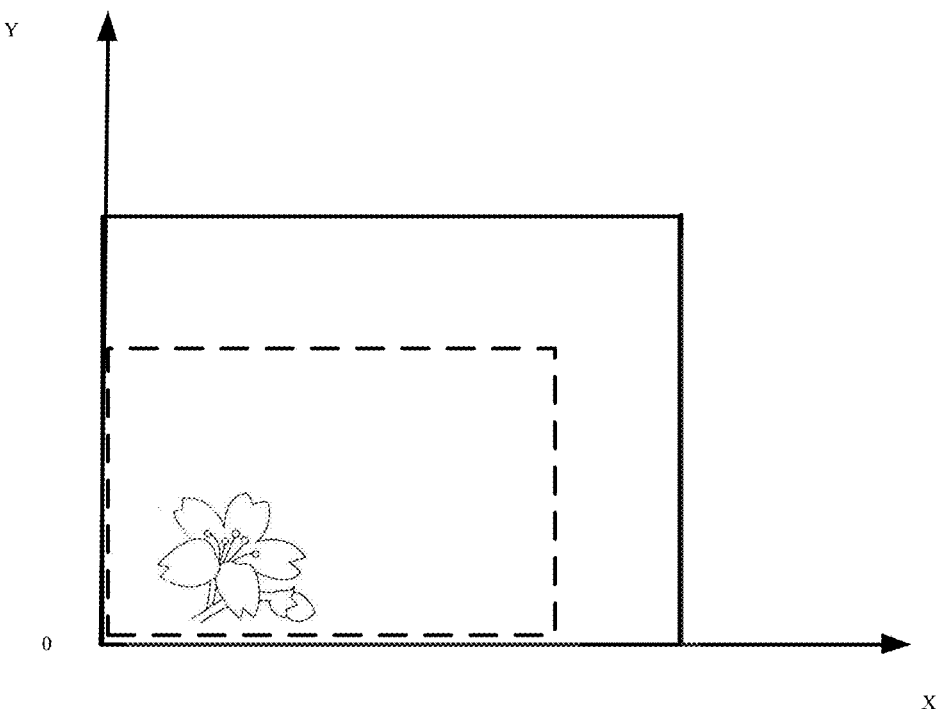
FIG. 13B illustrates a clipping picture under a condition that Xo<=Wt/2 and Yo<=Ht/2.

In the embodiments of the disclosure, a starting coordinate after adjustment is directly set to be (0, 0), and a corresponding clipped image is shown in FIG. 13B. It can be seen that the adjusting method by presetting a starting point coordinate shown in the embodiments of the disclosure may effectively avoid the black edge. In view of the above, in a case where Xo<=Wt/2 and Yo<=Ht/2, the starting point coordinate is directly set to be (0, 0), so that the black edge may be avoided while an image needed by the user may be maximized.

A second method for adjusting the position of the clipping box includes: the second center point coordinate is (Xo, Yo), and a coordinate of the lower left corner of the adjusted clipping box is (X2, Y2);
  if Wt/2<Xo<=Wc/2, X2=Xo−Wt/2; and
  if Ht/2<Yo<=Hc/2, Y2=Ho−Ht/2.

In some embodiments, the resolution of the display is 1600*900, the resolution of the image data is 1856*1392, correspondingly, Wt=900, Ht=1600, Wc=1392, and Hc=1856.

In the embodiments of the disclosure, the second center point coordinate input from the user is (900, 500), in this case, in order to guarantee that the image shown on the display meets the demands of the user to the maximum degree, a center point of the clipping box needs to be moved to a position same with the second center point. Then the image is clipped according to the position of the clipping box. Specifically, firstly, the center of the clipping box is moved to the coordinate of the second center point, that is, the center point of the clipping box is moved to the second center point. The centre coordinate of the clipping box after the moved is (900, 500), and a coordinate (100, 50) of the lower left corner of the clipping box after adjustment is determined according to the resolution of the clipping box.

The embodiments of the disclosure provides a solution for determining a starting coordinate after adjustment:
  the second center point coordinate is (Xo, Yo), and the coordinate of the lower left corner of the adjusted clipping box is (X2, Y2);
  if Wt/2<Xo<=Wc/2, X2=Xo−Wt/2; and
  if Ht/2<Yo<=Hc/2, Y2=Ho−Ht/2.

By the computing solution for the starting point shown in the embodiments of the disclosure, if Wt/2<Xo<=Wc/2 and Ht/2<Yo<=Hc/2, the center of the clipping box may be directly moved to the coordinate of the second center point, then the coordinate of the lower left corner of the adjusted clipping box is determined. Finally, a clipped region is determined according to the coordinate of the lower left corner of the clipping box after adjustment and meeting requirements, and finally the image data is clipped out.

A third method for pre-setting a starting coordinate:
  the second center point coordinate is (Xo, Yo), and a coordinate of the lower left corner of the adjusted clipping box is (X3, Y3);
  if Wc/2<Xo<=Wc−Wt/2, X3=Xo−Wt/2; and
  if Ht/2<Yo<=Hc/2, Y3=Ho−Ht/2.

In some embodiments, the resolution of the display is 1600*900, the resolution of the image data is 1856*1392, correspondingly, Wt=900, Ht=1600, Wc=1392, and Hc=1856.

In the embodiments of the disclosure, the second center point coordinate input from a user is (1000, 600), in this case, in order to make sure that the image shown on the display meets the demands of the user to the maximum degree, the center point of the clipping box needs to coincide with the second center point, and then the image is clipped according to the position of the clipping box. Specifically, firstly, the center of the clipping box is moved to the coordinate of the second center point. The coordinate of the moved clipping box centre is (1000, 600), and the coordinate (200, 150) of the lower left corner of the adjusted clipping box is determined.

By the solution for computing a coordinate of the lower left corner of the adjusted clipping box shown in the embodiments of the disclosure, if Wc/2<Xo<=Wc−Wt/2 and Ht/2<Yo<=Hc/2, the coordinate of the lower left corner of the clipping box after the adjustment may be directly determined according to the coordinate of the second center point input from the user and the size of the clipping box. Finally, according to the coordinate of the adjusted starting point and the size of the clipping box meeting requirements, the clipped region is determined, and finally, the image are clipped out.

A fourth method for adjusting a pre-set starting point coordinate:
  according to the second center point coordinate and a set of resolutions, the coordinate of the pre-set starting point is adjusted, step of generating the coordinate of the starting point further includes:
  the second center point coordinate is (Xo, Yo), and a coordinate of the lower left corner of the adjusted clipping box is (X4, Y4);
  if Wc−Wt/2<Xo, X4=Wc−Wt; and
  if Hc−Ht/2<Yo, Y4=Hc−Ht.

The resolution of the display is 1600*900, the resolution of the image data is 1856*1392, correspondingly, Wt=900, Ht=1600, Wc=1392, and Hc=1856.

Figure 14A:
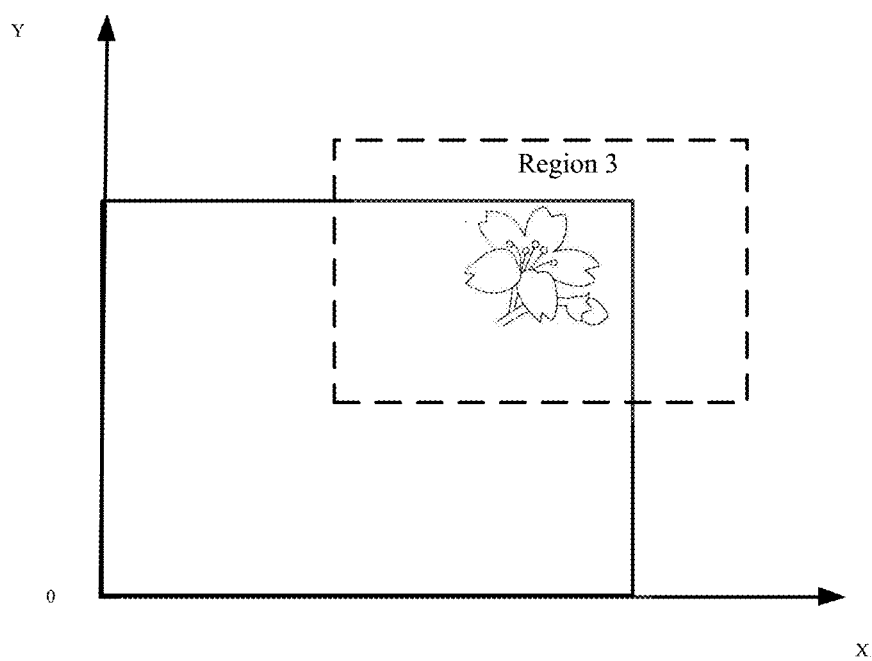
FIG. 14A illustrates a clipping picture under a condition that Xo<=Wt/2 and Yo<=Ht/2.
Figure 14B:
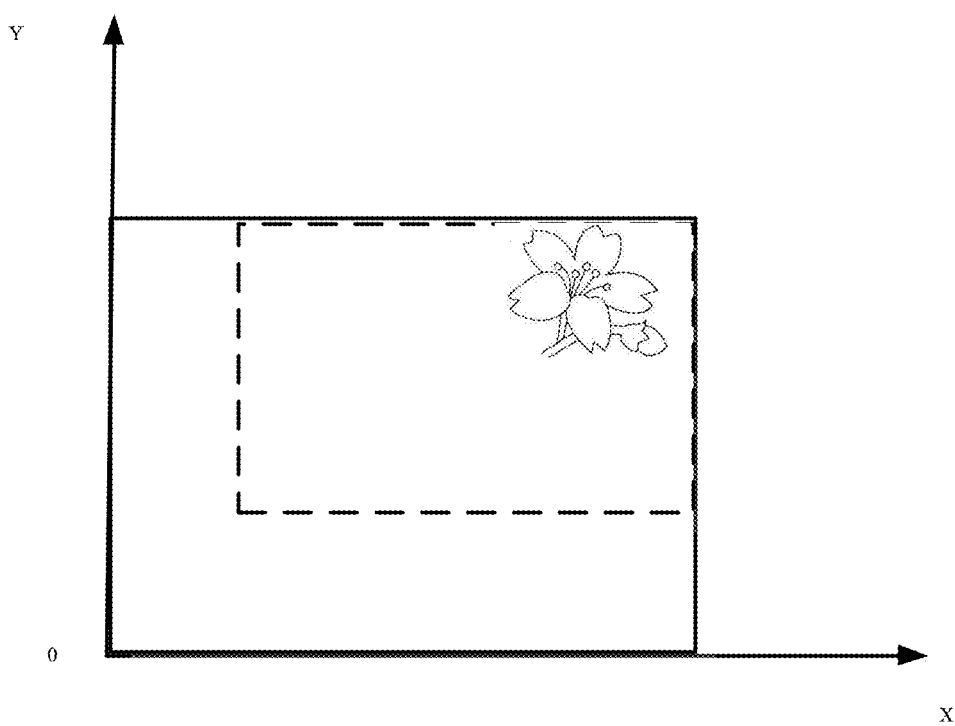
FIG. 14B illustrates a clipping picture under a condition that Xo<=Wt/2 and Yo<=Ht/2.

In the embodiments of the disclosure, if the user wants to display the flower pattern in the display, the second center point coordinate input from the user is (1092, 1356), Wc−Wt/2<Xo, and Hc−Ht/2<Yo. In this case, if the position of the center point of the clipping box is directly adjusted to the position of the second center point, a situation in FIG. 14A will occur. A display effect on the display is that a corresponding image may not be displayed in a position of a region 3. In order to avoid the above problem, the embodiments of the disclosure provide a solution.
  If Wc−Wt/2<Xo, X4=Wc−Wt; and
  If Hc−Ht/2<Yo, Y4=Hc−Ht.

According to the embodiments of the disclosure, a left edge of the lower left corner of the clipping box after adjustment is directly set to be (942, 1056), and a corresponding clipping picture is shown in FIG. 13B. In a case where Xo<=Wt/2 and Yo<=Ht/2, the coordinate of the starting point is directly set to be (942, 1056), so that the black edge may be avoided while the image needed by the user may be displayed to the maximum degree.

Figure 15:
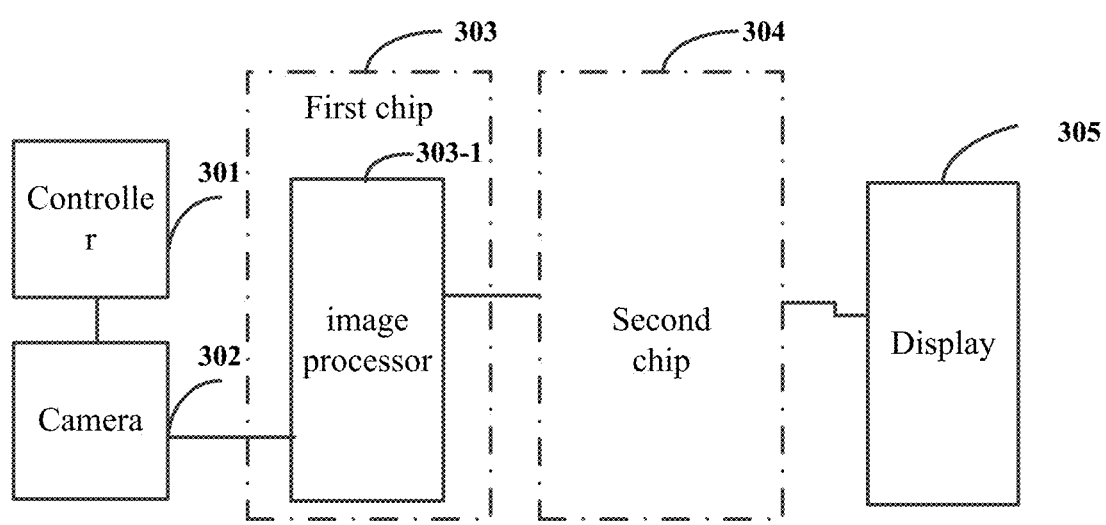
FIG. 15 illustrates a structural block diagram of a display apparatus.

A second aspect of the embodiments of the disclosure provides a display apparatus, in FIG. 15, including:
  a controller 301 configured to receive a control signal from a user input interface, wherein the control signal is configured for turning on or turning off the camera 302;
  a camera 302 configured to capture image data with a first aspect ratio;
  a first chip 303 comprising an image processor 303-1, the image processor 303-1 is configured to receive image data from the camera 302 in response to an control signal for indicating turning on the camera; adjust a center position of a clipping box according to a position of at least one target object in the image data; and output an adjusted image to a second chip 304, the adjusted image is the image in the clipping box after adjustment, the clipping box is configured with a second aspect ratio, and the first aspect ratio is different from the second aspect ratio; and
  the second chip 304, configured to receive the adjusted image from the image processor 303-1 and output the adjusted image to a display 305.

The image processor 303-1 is further configured to output the initial image picture in response to the image data input from the camera 302. The initial image is a portion of the image data in the region of the clipping box in an initial state.

In the initial state, a coordinate of a lower left corner of the clipping box before the adjusting is (X, Y), X=(Wc−Wt)/2; and Y=(Hc−Ht)/2, Wc is a width of the image data, Hc is a height of the image data; and Wt is a width of the clipping box, and Ht is a height of the clipping box.

The display 305 is configured to present an image interface, a user interface and a selector for indicating an item being selected in the user interface. The image interface is configured to display the adjusted image output from the image processor 303-1.

In response a selection via the selector from a user, the image processor 303-1 is further configured to obtain a position of a target object selected by the user.

The image processor 303-1 is further configured to automatically recognize the position of the target object according to image data input from the camera 302.

A coordinate of the position of the target object is (Xo, Yo).

The image processor 303-1 is further configured to adjust the position of the clipping box based on the position of the target object, and a coordinate of a lower left corner of the clipping box after adjustment is (X1,Y1);

if Xo<=Wt/2, the image processor 303-1 determines that X1=0; and if Yo<=Wt/2, the image processor 303-1 determines that Y1=0, where Wt is a width of the clipping box, and Ht is a height of the clipping box.

The coordinate of the target object is (Xo,Yo);

the image processor 303-1 is further configured to adjust the position f the clipping box based on the position of the target object, and a coordinate of the lower left corner of the clipping box after adjustment is (X2,Y2);

if Wt/2<Xo<=Wc/2, the image processor 303-1 determines that X2=Xo−Wt/2; and if Ht/2<Yo<=Hc/2, the image processor 303-1 determines that Y2=Ho−Ht/2, where Wc is a width of the image data, Hc is a height of the image data, Wt is a width of the clipping box, and Ht is a height of the clipping box.

The coordinate of the target object is (Xo,Yo);

the image processor 303-1 is further configured to adjust the position of the clipping box based on the position of the target object, and a coordinate of the lower left corner of the clipping box after adjustment is (X3,Y3);

if Wc/2<Xo<=Wc−Wt/2, the image processor 303-1 determines that X3=Xo−Wt/2; and if Ht/2<Yo<=Hc/2, the image processor 303-1 determines that Y3=Ho−Ht/2;

Wc is a width of the image data, Hc is a height of the image data, Wt is a width of the clipping box, and Ht is a height of the clipping box.

Figure 16:
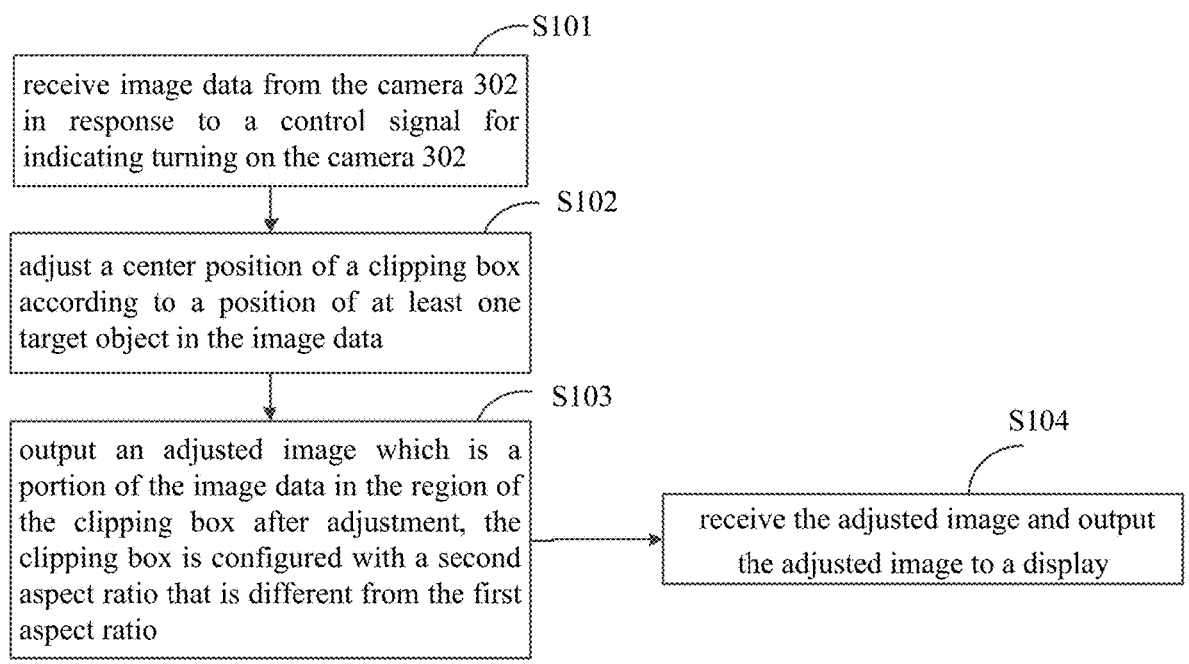
FIG. 16 illustrates a flowchart of an image processing method.

A third aspect of the embodiments of the disclosure provides an image processing method. Specifically, in FIG. 16, the method is applied to the display apparatus. The display apparatus includes a camera 302, configured to capture image data with a first aspect ratio;

a first chip 303, comprising an image processor 303-1, the image processor 303-1 is configured to:

S101, receive image data from the camera 302 in response to a control signal for indicating turning on the camera 302;

S102, adjust a center position of a clipping box according to a position of at least one target object in the image data; and S103, output an adjusted image which is a portion of the image data in the region of the clipping box after adjustment, the clipping box is configured with a second aspect ratio that is different from the first aspect ratio; and a second chip 304, configured to S104 receive the adjusted image and output the adjusted image to a display 305;

the adjusted image is a second portion of the image data in the region of the clipping box after adjustment. In other words, the adjusted image is an image corresponding to the second portion of the image data in the region of the clipping box after adjustment.

The embodiments of the disclosure provide the display 305 and the image processing method. In the embodiments of the disclosure, when the display apparatus receives the image data, according to the center position of the target object in the image, the position of the clipping box is adjusted; and the adjusted image is output to the second chip 304, the adjusted image is a portion of the image data in the region of the clipping box after adjustment, and the second chip 304 is configured to receive the adjusted image output from the image processor 303-1 and output the adjusted image to the display 305. In the embodiments of the disclosure, when the user uses the display apparatus for live streaming and image capture, if the user wants to adjust the shooting position, the user does not need to move back and forth, an effect of adjusting the displayed picture on the display 305 may be achieved by adjusting the position of a display frame, and good user experience is achieved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display apparatus, comprising:
   a camera configured to capture image data with a first aspect ratio;
   a controller configured to receive a control signal from a user input interface, wherein the control signal is configured for indicating turning on or turning off the camera,
   a display configured with a second aspect ratio, and configured to present a user interface, wherein the user interface is configured to show contents in an application associated with the camera; and
   an image processor configured to:
      receive the image data from the camera in response to a control signal for indicating turning on the camera;
      present an initial image on the display, wherein the initial image is a first portion of the image data in the region of a clipping box in the image data received from the camera, wherein the clipping box is configured with the second aspect ratio that is different from the first ratio of the image data, and a center point of the clipping box is same as a center point of the image data, the image data comprises at least one target object;

adjust the center point of the clipping box according to a position of the at least one target object in the image data, wherein the at least one target object is in the clipping box after adjustment; and output an adjusted image to the display, wherein the adjusted image is a second portion of the image data in the region of the clipping box after adjustment, wherein a distance between a center point of the at least one target object and a center point of the clipping box after adjustment is minimized to make the at least one target object approximate at the center of the clipping box and no black edge exists on the display;

wherein a coordinate of a lower left corner of the clipping box before the adjustment is (X, Y), X=(Wc−Wt)/2; and Y=(Hc−Ht)/2, wherein Wc is a width of the image data, Hc is a height of the image data; and Wt is a width of the clipping box, and Ht is a height of the clipping box.

2. The display apparatus according to claim 1, wherein the display is configured to present an image interface and a selector in the user interface for indicating an item being selected in the user interface;

wherein the image interface is configured to present the adjusted image output from the image processor on the display; and the image processor is further configured to: in response to a selection for a target object among the at least one target object via the selector from a user, obtain a position of the target object selected by the user.

3. The display apparatus according to claim 1, wherein the image processor is further configured to automatically recognize positions of the at least one target object upon receiving the image data from the camera.

4. The display apparatus according to claim 2, wherein a center coordinate of the target object is (Xo, Yo);

the image processor is further configured to adjust position of the clipping box based on position of the target object, and a coordinate of a lower left corner point of the clipping box after adjustment is (X1, Y1);

if Xo<=Wt/2, the image processor determines that X1=0; and if Yo<=Ht/2, the image processor determines that Y1=0, wherein Wt is a width of the clipping box, and Ht is a height of the clipping box.

5. The display apparatus according to claim 2, wherein a center coordinate of the target object is (Xo, Yo);

the image processor is further configured to: adjust the position of the clipping box based on position of the target object, and a coordinate of a lower left corner point of the clipping box after adjustment is (X2, Y2);

if Wt/2<Xo<=Wc/2, the image processor determines that X2=Xo−Wt/2; and

If Ht/2<Yo<=Hc/2, the image processor determines that Y2=Ho−Ht/2, wherein

Wc is a width of the image data, Hc is a height of the image data, Wt is a height of the clipping box, and Ht is a height of the clipping box.

6. The display apparatus according to claim 2, wherein a center coordinate of the target object is (Xo, Yo);

the image processor is further configured to adjust the position of the clipping box based on position of the target object, and a coordinate of a lower left corner point of the clipping box after adjustment is (X3,Y3);

if Wc/2<Xo<=Wc−Wt/2, the image processor determines that X3=Xo−Wt/2; and if Ht/2<Yo<=Hc/2, the image processor determines that Y3=Ho−Ht/2, wherein Wc is a width of the image data, Hc is a height of the image data, Wt is a width of the clipping box, and Ht is a height of the clipping box.

7. An image processing method for a display apparatus with a camera, comprising:

in response to a control signal for indicating turning on the camera, receiving image data from the camera, wherein the camera is configured to capture the image data with a first aspect ratio, the image data comprises at least one target object, and the display apparatus comprises a display with a second aspect ratio that is different from the first aspect ratio;

presenting an initial image on the display, wherein the initial image is a first portion of the image data in the region of a clipping box set in the image data received from the camera, wherein the clipping box is configured with the second aspect ratio, and a center point of the clipping box is same with a center point of the image data, the image data comprises at least one target object;

adjusting the center point of the clipping box according to a position of the at least one target object in the image data, wherein the at least one target object is in the clipping box after adjustment; and outputting an adjusted image to the display, wherein the adjusted image is a second portion of the image data in the region of the clipping box after adjustment, wherein a distance between a center point of the at least one target object and a center point of the clipping box after adjustment is minimized to make the at least one target object approximate at the center of the clipping box and no black edge exists on the display;

wherein a coordinate of a lower left corner of the clipping box before the adjustment is (X, Y);

X=(Wc−Wt)/2; and Y=(Hc−Ht)/2, wherein

Wc is a width of the image data, Hc is a height of the image data; and

Wt is a width of the clipping box, and Ht is a height of the clipping box.

8. The method according to claim 7, further comprising:

in response to a selection for a target object among the at least one target object via a selector from a user, obtaining a position of the target object selected by the user.

9. The method according to claim 7, further comprising:

automatically recognizing position of the at least one target object upon receiving the image data from the camera.

10. The method according to claim 8, wherein a center coordinate of the target object is (Xo,Yo), and the method further comprising:

adjusting position of the clipping box based on position of the at least one target object, and a coordinate of a lower left corner point of the clipping box after adjustment is (X1,Y1);

if Xo<=Wt/2, the image processor determines that X1=0; and if Yo<=Ht/2, the image processor determines that Y1=0, wherein Wt is a width of the clipping box, and Ht is a height of the clipping box.

11. The method according to claim 8, wherein a center coordinate of the target object is (Xo,Yo), and the method further comprising:

adjusting the position of the clipping box based on position of the target object, and a coordinate of a lower left corner point of the clipping box after adjustment is (X2,Y2);

if Wt/2<Xo<=Wc/2, the image processor determines that X2=Xo−Wt/2; and

If Ht/2<Yo<=Hc/2, the image processor determines that Y2=Ho−Ht/2, wherein

Wc is a width of the image data, Hc is a height of the image data, Wt is a height of the clipping box, and Ht is a height of the clipping box.

12. The method according to claim 8, wherein a center coordinate of the target object is (Xo,Yo); and the method further comprising:

adjusting the position of the clipping box based on position of the target object, and a coordinate of a lower left corner point of the clipping box after adjustment is (X3,Y3);

if Wc/2<Xo<=Wc−Wt/2, the image processor determines that X3=Xo−Wt/2; and if Ht/2<Yo<=Hc/2, the image processor determines that Y3=Ho−Ht/2, wherein Wc is a width of the image data, Hc is a height of the image data, Wt is a width of the clipping box, and Ht is a height of the clipping box.

* * * * *